US012645306B2

(12) United States Patent
Kwon et al.

(10) Patent No.: US 12,645,306 B2
(45) Date of Patent: Jun. 2, 2026

(54) ELECTRONIC APPARATUS AND METHOD OF CONTROLLING THE SAME

(71) Applicant: SAMSUNG ELECTRONICS CO., LTD., Suwon-si (KR)

(72) Inventors: Okyun Kwon, Suwon-si (KR); Seongui Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 18/416,007

(22) Filed: Jan. 18, 2024

(65) Prior Publication Data

US 2024/0160296 A1 May 16, 2024

Related U.S. Application Data

(63) Continuation of application No. PCT/KR2022/010723, filed on Jul. 21, 2022.

(30) Foreign Application Priority Data

Jul. 26, 2021 (KR) ........................ 10-2021-0097565

(51) Int. Cl.
*G06F 3/023* (2006.01)
*G06F 3/01* (2006.01)
(Continued)

(52) U.S. Cl.
CPC ............ *G06F 3/0236* (2013.01); *G06F 3/018* (2013.01); *G06F 3/0482* (2013.01); *G06F 3/04842* (2013.01)

(58) Field of Classification Search
None
See application file for complete search history.

(56) References Cited

U.S. PATENT DOCUMENTS

2008/0042885 A1* 2/2008 Kunigita ............... G06F 3/0236
341/28
2008/0117171 A1* 5/2008 Kwak .............. H04N 21/42204
345/168
(Continued)

FOREIGN PATENT DOCUMENTS

KR 20-0221583 5/2001
KR 200221583 Y1 * 5/2001
(Continued)

OTHER PUBLICATIONS

Machine translation of KR200221583Y1, retrieved from FIT Search tool. (Year: 2002).*

(Continued)

*Primary Examiner* — Linda Huynh
(74) *Attorney, Agent, or Firm* — STAAS & HALSEY LLP

(57) ABSTRACT

A character input keyboard including a first key area where character keys corresponding to a first character group are arranged, a second key area where character keys corresponding to a second character group are arranged, and a conversion key arranged between the first key area and the second key area. A processor is configured to display a first character corresponding to a selected character key based on selection of a character key in the first key area or the second key area, and display a second character associated with the first character in place of the first character based on selection of the conversion key while the first character is being displayed.

15 Claims, 16 Drawing Sheets

(51) Int. Cl.
  *G06F 3/0482* (2013.01)
  *G06F 3/04842* (2022.01)

(56) References Cited

U.S. PATENT DOCUMENTS

| | | | | |
|---|---|---|---|---|
| 2011/0078567 A1* | 3/2011 | Kim | ..................... | G06F 3/0236 |
| | | | | 345/173 |
| 2012/0331383 A1* | 12/2012 | Park | ................... | G06F 3/04886 |
| | | | | 715/703 |
| 2013/0091455 A1* | 4/2013 | Park | ................... | G06F 3/04886 |
| | | | | 715/773 |
| 2014/0281995 A1* | 9/2014 | Kim | ....................... | G06F 3/018 |
| | | | | 715/728 |
| 2014/0285442 A1* | 9/2014 | Jeong | ................... | G06F 3/0235 |
| | | | | 345/171 |
| 2016/0334988 A1 | 11/2016 | Kim et al. | | |
| 2018/0348887 A1* | 12/2018 | Paik | ..................... | G06F 40/109 |

FOREIGN PATENT DOCUMENTS

| | | |
|---|---|---|
| KR | 10-2005-0001848 | 1/2005 |
| KR | 10-2006-0062265 | 6/2006 |
| KR | 10-2007-0012265 | 1/2007 |
| KR | 10-2008-0064258 | 7/2008 |
| KR | 10-2008-0092137 | 10/2008 |
| KR | 10-2009-0070357 | 7/2009 |
| KR | 10-2010-0118821 | 11/2010 |
| KR | 10-1371325 | 3/2014 |
| KR | 10-2014-0115060 | 9/2014 |
| KR | 10-2014-0122826 | 10/2014 |
| KR | 10-2015-0081181 | 7/2015 |
| KR | 10-2123306 | 6/2020 |
| KR | 20230032136 A * 3/2023 ......... G06F 3/04892 |  |

OTHER PUBLICATIONS

International Search Report, PCT/ISA/210, dated Nov. 11, 2022, in PCT Application No. PCT/KR2022/010723.
Written Opinion, PCT/ISA/237, dated Nov. 11, 2022, in PCT Application No. PCT/KR2022/010723.
Office Action dated Oct. 21, 2025, issued in Korean Application No. KR 10-2021-0097565.

* cited by examiner

ELECTRONIC APPARATUS AND METHOD OF CONTROLLING THE SAME

CROSS-REFERENCE TO RELATED APPLICATION

This application is a continuation application, under U.S.C. § 111(a), of international application No. PCT/KR2022/010723, filed on Jul. 21, 2022, which claims priority under 35 U. S. C. § 119 to Korean Patent Application No. 10-2021-0097565 filed on Jul. 26, 2021 in the Intellectual Property Office, the disclosures of which are incorporated by reference herein in their entirety.

The disclosure relates to an electronic apparatus and a method of controlling the same, and more particularly to an electronic apparatus, to which characters are input through a character input keyboard and an input device, and a method of controlling the same.

BACKGROUND ART

Technical Field

With the development of technology, various types of electronic apparatuses are being developed and spread. For example, various electronic apparatuses such as a smart TV, a smartphone, a tablet personal computer (PC), a smart pad, a smart note, a desktop or laptop PC, and a set-top box are being used.

As the use of electronic apparatuses expands, demand for convenient use of various functions through interaction with a user is also increasing. For example, the smart TV or the like electronic apparatus may interact with a user by displaying a character input keyboard, where characters are arranged, on a display, using an input device provided with arrow keys to move a cursor, and selecting a character pointed by the cursor to type a text corresponding to the user's command.

Therefore, to type a text under a TV environment, movement operations with the arrow keys are repetitively required to select desired characters on the character input keyboard, thereby wasting time and causing a user's inconvenience.

Technical Problem

An aspect of the disclosure is to provide an electronic apparatus, in which user input using arrow keys of an input device is improved in convenience, and a method of controlling the same.

Technical Solution

According to an embodiment of the disclosure, an electronic apparatus includes: a display; an interface; and a processor configured to display a character input keyboard, which includes a plurality of character keys corresponding to a plurality of characters of a specific language, and a cursor for pointing any one of the plurality of character keys, on the display, and to perform an input operation for a character corresponding to a character key pointed by the cursor among the plurality of character keys based on movement and selection instructions received through the interface, at least one character selected from a first character group among the plurality of characters and at least one character selected from a second character group among the plurality of characters are combinable to form a syllable of the language, the character input keyboard includes: a first key area where character keys of the plurality of character keys corresponding to the first character group are arranged, a second key area where character keys of the plurality of character keys corresponding to the second character group are arranged, and a conversion key arranged between the first key area and the second key area, and the processor is configured to display a first character corresponding to a selected character key based on selection of the character key in the first key area or the second key area, and display a second character associated with the first character in place of the first character based on selection of the conversion key while the first character is being displayed.

The plurality of characters may include Hangul (Korean alphabet). The first character group may correspond to a consonant group, and the second character group may correspond to a vowel group. The first character may correspond to a single letter, and the second character may correspond to a combining letter of the first character.

The conversion key may be shaped like a bar extending in a second direction perpendicular to a first direction in which the first key area and the second key area are arranged, and have a length in the second direction corresponding to the first key area or the second key area.

The processor may be configured to control the cursor to be displayed as moved to the conversion key, based on selection of the character key in the first key area or the second key area. The processor may be configured to: display the cursor as moved to the conversion key, based on identification that the second character predefined for the first character corresponding to the selected character key is present; and control the cursor not to move to the conversion key, based on identification that the second character predefined for the first character corresponding to the selected character key is absent.

Based on selection of a character key in one area of the first key area and the second key area, the processor may be configured to control the cursor as moved to any character key in an other area of the first key area and the second key area. The processor may be configured to control the cursor to be displayed as moved to any character key in the other area, based on identification that the second character predefined for the first character corresponding to the selected character key is absent.

The plurality of character keys may be arranged as a matrix form in the first key area and the second key area, and the processor may be configured to control the cursor to be displayed as moved to a preset reference position or a same row or column position in the first key area and the second key area, based on a movement instruction for the cursor received through the interface.

According to an embodiment of the disclosure, a method of controlling an electronic apparatus includes: displaying a character input keyboard, which includes a plurality of character keys corresponding to a plurality of characters of a specific language, and a cursor for pointing any one of the plurality of character keys, on a display; and performing an input operation for a character corresponding to a character key pointed by the cursor among the plurality of character keys based on movement and selection instructions received through an interface, at least one character selected from a first character group among the plurality of characters and at least one character selected from a second character group among the plurality of characters are combinable to form a syllable of the language, the character input keyboard includes: a first key area where character keys of the plurality of character keys corresponding to the first character group are arranged, a second key area where character keys of the plurality of character keys corresponding to the second character group are arranged, and a conversion key arranged between the first key area and the second key area, and the performing the input operation for the character includes: displaying a first character corresponding to a selected character key based on selection of the character key in the first key area or the second key area, and displaying a second character associated with the first character in place of the first character based on selection of the conversion key while the first character is being displayed.

The conversion key may be shaped like a bar extending in a second direction perpendicular to a first direction in which the first key area and the second key area are arranged, and have a length in the second direction corresponding to the first key area or the second key area.

The method may further include controlling the cursor to be displayed as moved to the conversion key, based on selection of the character key in the first key area or the second key area. The method may further include: displaying the cursor as moved to the conversion key, based on identification that the second character predefined for the first character corresponding to the selected character key is present; and controlling the cursor not to move to the conversion key, based on identification that the second character predefined for the first character corresponding to the selected character key is absent.

The method may further include controlling the cursor to be displayed as moved to any character key in an other area, based on identification that the second character predefined for the first character corresponding to the selected character key is absent.

The plurality of character keys may be arranged as a matrix form in the first key area and the second key area, and the method may further include controlling the cursor to be displayed as moved to a preset reference position or a same row or column position in the first key area and the second key area, based on a movement instruction for the cursor received through the interface.

Advantageous Effects

As described above, an electronic apparatus according to the disclosure and a method of controlling the same provide a character input keyboard where a conversion key is provided between character key areas, thereby reducing the number of operations for arrow keys, and improving convenience in a user input using an input device.

DESCRIPTION OF DRAWINGS

The foregoing and other aspects, features and advantages according to embodiments of the disclosure will become more apparent from the following description, taken in conjunction with the accompanying drawings.

BEST MODE

Figure 1:
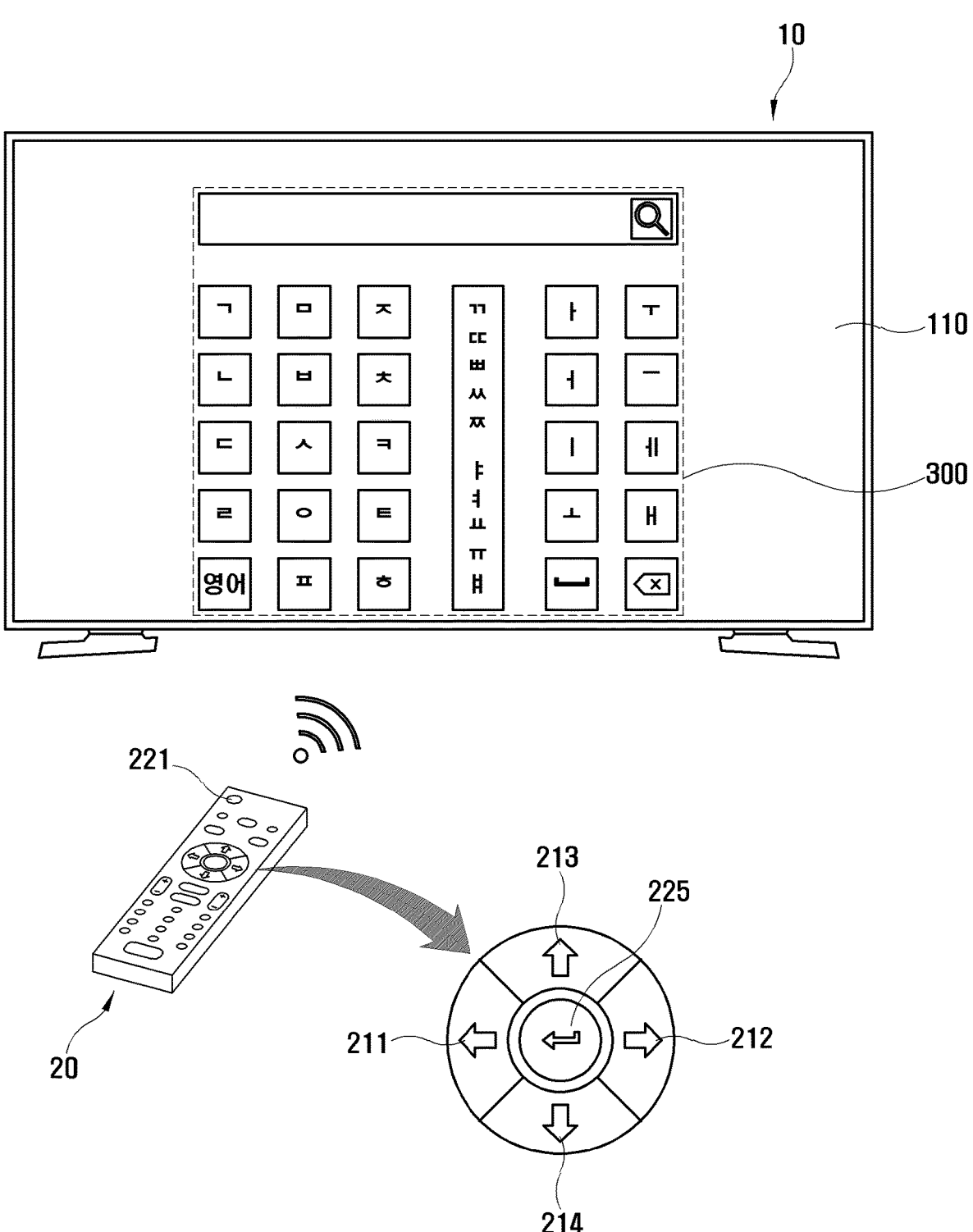
FIG. 1 illustrates an example of an electronic apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

FIG. 1 illustrates an example of an electronic apparatus according to an embodiment of the disclosure.

According to an embodiment of the disclosure, an electronic apparatus 10 may be implemented as a display apparatus including a display 110 as shown in FIG. 1.

The electronic apparatus 10 according to an embodiment of the disclosure receives a signal from an external signal source, for example, data about content, and processes the received data of content according to preset processes so as to be displayed as an image on the display 110.

According to an embodiment, the electronic apparatus 10 implemented as the display apparatus may include a TV that processes a broadcast image based on at least one among a broadcast signal, broadcast information or broadcast data received from a transmitter of a broadcasting station. In this case, the electronic apparatus 10 may include a tuner to be tuned to a channel corresponding to a broadcast signal.

However, the disclosure is not limited to the implementation example of the electronic apparatus 10. Alternatively, the electronic apparatus 10 may be implemented as an image processing apparatus such as a set-top box that transmits a signal to an external display connected by a wire or wirelessly. Alternatively, the electronic apparatus 10 may include various stationary and mobile digital apparatuses such as a smart phone, a tablet personal computer (PC), a smart pad, a smart note, a personal digital assistant (PDA), a portable multimedia player (PMP), a navigation apparatus, an MP3 player, and a desktop or laptop PC.

When the electronic apparatus 10 is a TV, the electronic apparatus 10 may receive broadcast content based on at least one among a broadcast signal, broadcast information or broadcast data from a transmitter of a broadcasting station directly or through an additional apparatus connectable with the electronic apparatus 10 by a cable, for example, through a set-top box (STB), a one-connect box (OC box), a media box, etc. Here, the connection between the electronic apparatus 10 and the additional apparatus is not limited to the cable, but may employ various wired/wireless interfaces.

The electronic apparatus 10 may, for example, wirelessly receive a radio frequency (RF) signal, i.e., broadcast content transmitted from the broadcasting station. To this end, the electronic apparatus 10 may include an antenna for receiving a broadcast signal.

In the electronic apparatus 10, the broadcast content may be received through a terrestrial wave, a cable, a satellite, etc., and a signal source is not limited to the broadcasting station. In other words, any apparatus or station capable of transmitting and receiving data may be included in the source according to the disclosure.

Figure 2:
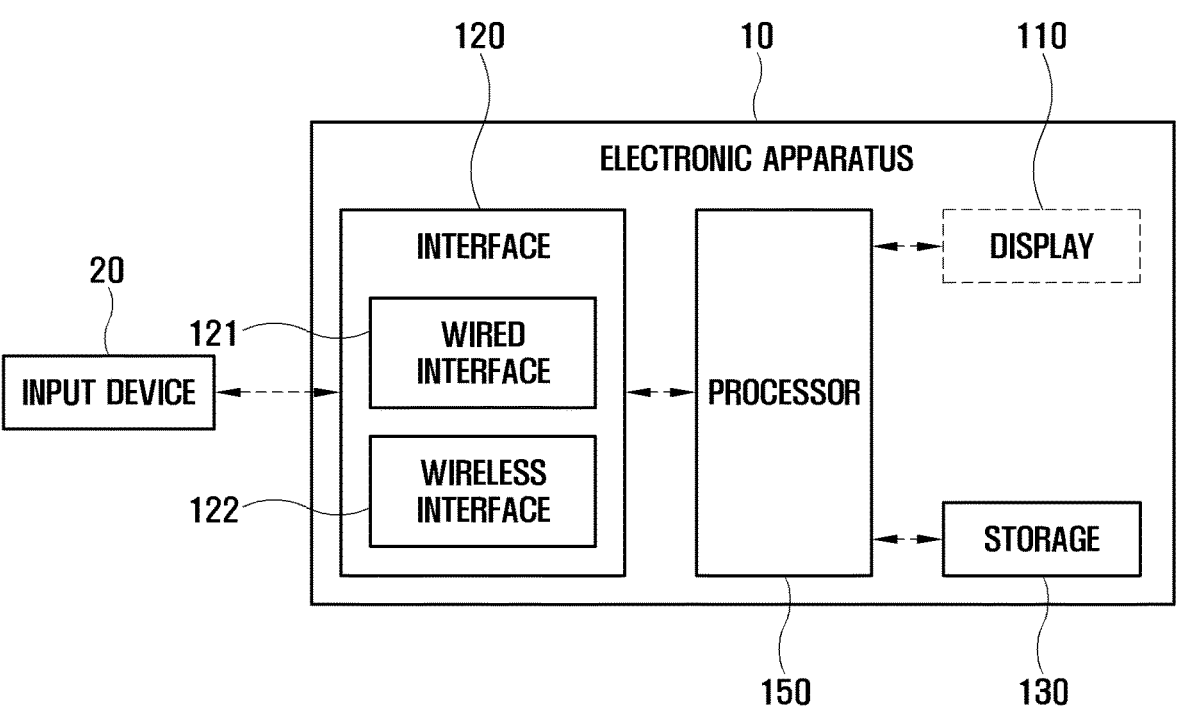
FIG. 2 is a block diagram of an electronic apparatus according to an embodiment of the disclosure.

Standards of a signal received in the electronic apparatus 10 may be varied depending on the types of the apparatus, and the electronic apparatus 10 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radioré-cepteurs et téléviseurs (SCART), universal serial bus (USB), or the like standards by a cable, according to the interface 120 (see FIG. 2).

According to an embodiment, the electronic apparatus 10 may be implemented as a smart TV or an Internet protocol (IP) TV. The smart TV refers to a TV that can receive and display a broadcast signal in real time, have a web browsing function to search and consume various pieces of content through the Internet while displaying the broadcast signal in real time, and provide a convenient user environment for this end. Further, the smart TV can provide an interactive service to a user because it includes an open software platform. Therefore, the smart TV can provide various pieces of content, for example, content of an application for a predetermined service to a user through the open software platform. Such an application refers to an application program for various kinds of services, for example, applications for social network service (SNS), finance, news, weather, map, music, movie, game, electronic book, and the like services.

The electronic apparatus 10 may process a signal to display a moving image, a still image, an application, an on-screen display (OSD), a user interface (UI) for controlling various operations, etc. on a screen based on a signal/data stored in an internal or external storage medium.

The electronic apparatus 10 may use wired or wireless network communication to receive content from various external apparatuses including a server and a terminal apparatus as a source for providing content, but there are no limits to the kinds of communication.

Specifically, the electronic apparatus 10 may use the wireless network communication to receive a signal corresponding to standards of Wi-Fi, Wi-Fi Direct, Bluetooth, Bluetooth low energy, Zigbee, UWB, NFC, etc. as image content corresponding to the type of the interface 120 (to be described later). Further, the electronic apparatus 10 may use Ethernet or the like wired network communication to receive a content signal.

According to an embodiment, the external apparatus implemented as the server may be provided as a content provider, i.e., a content server that can transmit content to various apparatuses such as the electronic apparatus 10 through the wired or wireless network. For example, the external apparatus may provide a media file based on video on demand (VOD) service, web content, etc. by a streaming method in real time.

The electronic apparatus 10 may execute an application for reproducing content, for example, a VOD application to receive content from an external apparatus provided as the server for providing the content, ad process the received content, thereby outputting, i.e., displaying an image corresponding to that content through the display 110. Here, the electronic apparatus 10 may receive the content from the server based on a user account corresponding to the executed application.

Referring to FIG. 1, the electronic apparatus 10 may receive a control signal wirelessly from an input device 20.

The input device 20 may, for example, be implemented by a remote control that generates a preset instruction/data/information/signal and transmits it to the electronic apparatus 10, thereby remotely controlling the electronic apparatus 10.

According to an embodiment, the input device 20 refers to an external device or peripheral device capable of performing wireless communication with the electronic apparatus 10, in which the wireless communication includes Bluetooth, infrared rays (IR), radio frequency (RF), Zigbee, wireless local area network (LAN), Wi-Fi direct, etc. The input device 20 may be controlled by a user to transmit a preset instruction to the electronic apparatus 10.

According to an embodiment, the input device 20 may include a plurality of buttons, and receive a user input corresponding to operate, i.e., press, push, or touch, for the button. The plurality of buttons may, for example, include four arrow buttons (or keys) 211, 212, 213 or 214 respectively corresponding to left, right, up and down directions, a power button (or key) 221, an enter or OK button (or key) 225, etc. Besides these examples, the plurality of buttons may further include various buttons, for example, numeral buttons (or keys), but descriptions about the features not directly related to this embodiment will be omitted.

According to an embodiment, the four arrow buttons 211, 212, 213, and 214 may include a left button 211 corresponding to a leftward movement, a right button 212 corresponding to a rightward movement, an up button 213 corresponding to an upward movement, and a down button 214 corresponding to a downward movement. When a user operates (e.g., presses or touches) one of the four arrow buttons 211, 212, 213, and 214 once, the input device 20 transmits a signal of a movement instruction to move once in the direction of the corresponding button. A target to be moved by the signal transmitted by the input device 20 may be provided variously corresponding to the display state of the electronic apparatus 10.

In response to the operations of the four arrow buttons 211, 212, 213, and 214, the electronic apparatus 10 may change a broadcast channel forwards or backwards one by one, or increase or decrease an audio volume. Alternatively, when a cursor (or pointer) is being displayed on a screen, the electronic apparatus 10 may move the cursor in response to the operations of the four arrow buttons 211, 212, 213, and 214. An enter button 225 is to click and select an item or object pointed by the cursor.

FIG. 1 illustrates an example that the input device 20 is implemented as a remote control with a plurality of arrow keys 211, 212, 213 and 214, in which the number, shape, position, etc. of the plurality of buttons including the arrow keys are not limited to those shown in FIG. 1.

For example, as shown in FIG. 1, in the state that a character input keyboard 300 where a plurality of character keys are arranged as virtual keys corresponding to a plurality of characters is displayed on the display 110 of the electronic apparatus 10, a user may operate the four arrow buttons 211, 212, 213, and 214 of the input device 20 to move the cursor to a desired character, and operate the enter button 225 to select that character.

Based on movement and selection instructions received from the input device 20, the electronic apparatus 10 may perform an input operation for a character corresponding to the character key pointed by the cursor among the plurality of character keys arranged on the character input keyboard 300.

According to an embodiment, the input device 20 such as the remote control may further include at least one of a touch sensor to receive a user's touch input or a motion sensor to detection the motion of the input device 20 handled by a user. The electronic apparatus 10 may perform an operation based on touch information or motion information received from the input device 20.

According to an embodiment, the input device 20 may include various devices capable of receiving a user input, as well as the remote control. The input device 20 may, for example, include a game console, a keyboard, a mouse, etc., and receive a user input as separated from the main body of the electronic apparatus 10.

According to an embodiment, the input device 20 includes a smartphone or the like terminal where a remote control application is installed. When this application is running on the terminal, an interface for touch input buttons corresponding to the four arrow buttons may be displayed on a touch screen. When a user touches the four arrow buttons displayed on the terminal, the terminal may transmit the movement instruction for the cursor to the electronic apparatus 10.

According to an embodiment, the electronic apparatus 10 may receive a control instruction based on a user's voice. To receive a voice/sound uttered by a user, a voice input unit, for example, a microphone may be provided in at least one of the main body of the electronic apparatus 10 or the input device 20 such as the remote control.

According to an embodiment, the electronic apparatus 10 may receive a user input through a keypad or input panel provided in the main body thereof and including a plurality of buttons.

FIG. 2 is a block diagram of an electronic apparatus according to an embodiment of the disclosure.

The electronic apparatus 10 includes various hardware elements for operations. However, FIG. 2 merely shows the exemplary elements of the electronic apparatus 10 according to an embodiment of the disclosure, and the first electronic apparatus according to an alternative embodiment may include elements different from those of FIG. 2. In other words, the electronic apparatus 10 of the disclosure may include another element besides the elements shown in FIG. 2, or may exclude at least one element from the elements shown in FIG. 2. Further, the electronic apparatus 10 of the disclosure may be implemented by changing some elements of those shown in FIG. 2.

The electronic apparatus 10 according to an embodiment of the disclosure may, as shown in FIG. 2, include the display 110.

The display 110 may display an image.

The display 110 may be, but not limited to, for example implemented by various display types such as liquid crystal, plasma, light-emitting diode, organic light-emitting diode, surface-conduction electron-emitter, carbon nano-tube, nano-crystal, etc.

According to an embodiment, the display 110 may include a display panel for displaying an image, and may further include an additional element, for example, a driver, according to its implementation types.

According to an embodiment, the display 110 may display the character input keyboard 300. Referring to FIG. 1, the character input keyboard 300 may be displayed in a certain area, for example, a lower center area of the display 110.

According to an embodiment, the character input keyboard 300 may include a plurality of keys (virtual keys) having a predetermined layout, and an input window displaying an input result from the plurality of keys. The plurality of keys may include character keys provided corresponding to the plurality of characters, and a conversion key provided to convert the characters corresponding to the character keys.

According to an embodiment, the character input keyboard 300 may further include the cursor (or pointer) displayed to be movable corresponding to the position of a user input made through the input device 20. The cursor may, for example, be displayed to point one of the plurality of character keys of the character input keyboard 300, and moved corresponding to the direction of the corresponding key as one of the four arrow buttons 211, 212, 213, and 214 of the input device 20 is operated.

According to an embodiment, the cursor may be an icon having various shapes such as an arrow, or may be implemented in such a way that the current position of a user input, for example, one of the character keys of the character input keyboard 300 is highlighted. The highlight may, for example, include a thick outline, change in color, addition of shading, change in size, bold, animation effects such as blinking, etc. There are no limits to the form/type of highlight, and the selected character key may be displayed as necessary with two or more types of highlight applied thereto.

The electronic apparatus 10 may include an interface 120.

The interface 120 allows the electronic apparatus 10 to communicate with various external apparatuses such as the input device 20 and the server.

The interface 120 may include a wired interface 121. The wired interface 121 may include a connector for transmitting/receiving a signal/data based on the standards such as high-definition multimedia interface (HDMI), HDMI-consumer electronics control (CEC), USB, Component, DP, DVI, Thunderbolt, RGB cables, etc. Here, the wired interface 121 may include at least one connector, terminal or port respectively corresponding to such standards.

The wired interface 121 is embodied to include an input port to receive a signal from the source or the like, and further include an output port as necessary to interactively transmit and receive a signal.

The wired interface 121 may include a connector, port, etc. based on video and/or audio transmission standards, such as an HDMI port, a DisplayPort, a DVI port, Thunderbolt, composite video, component video, super video, and SCART, so as to connect with an antenna for receiving a broadcast signal based on broadcast standards such as terrestrial/satellite broadcasts, or a cable for receiving a broadcast signal based on cable broadcast standards. Alternatively, the electronic apparatus 10 may include a built-in antenna for receiving a broadcast signal.

When a video/audio signal received through the interface 120 is a broadcast signal, the electronic apparatus 10 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

The wired interface 121 may include a connector or port based on universal data transmission standards, such as a USB port. The wired interface 121 may include a connector or port to which an optical cable based on optical transmission standards is connectable. The wired interface 121 may include a connector or port to which an external microphone or an external audio device with a microphone is connected for the reception or input of an audio signal from the microphone or audio device. The wired interface 121 may include a connector or port to which a headset, an earphone, an external loudspeaker and the like audio device is connected for the transmission or output of an audio signal to the audio device. The wired interface 121 may include a connector or port based on network transmission standards such as Ethernet. For example, the wired interface 121 may be implemented as a local area network (LAN) connected to a router or a gateway by a wire.

The wired interface 121 is connected to a set-top box, an optical media reproducing device or the like external device, an external display apparatus, a loudspeaker, a server, etc. through the connector or port by 1:1 or 1:N (where, N is a natural number), thereby receiving a video/audio signal from the external device or transmitting a video/audio signal to the external device. The wired interface 121 may include connectors or ports for individually transmitting video/audio signals.

The wired interface 121 may be implemented by a communication circuitry including wireless communication modules (e.g., an S/W module, a chip, etc.) corresponding to various kinds of communication protocols.

According to an embodiment, the wired interface 121 may be built-in the electronic apparatus 10 or implemented as a dongle or a module and detachably connected to the connector of the electronic apparatus 10.

The interface 120 may include a wireless interface 122. The wireless interface 122 may be variously implemented corresponding to the implementation of the electronic apparatus 100. For example, the wireless interface 122 may employ wireless communication methods such as radio frequency, Zigbee, Bluetooth, Wi-Fi, ultrawideband (UWB), near field communication (NFC), etc.

The wireless interface 122 may be implemented by a communication circuitry including wired or wireless communication modules (e.g., an S/W module, a chip, etc.) corresponding to various kinds of communication protocols.

According to an embodiment, the wireless interface 122 includes a wireless local area network (WLAN) unit. The WLAN unit may be wirelessly connected to external apparatuses through an access point (AP) under control of a processor 140. The WLAN unit includes a Wi-Fi communication module.

According to an embodiment, the wireless interface 122 includes a wireless communication module supporting one-to-one direct communication between the electronic apparatus 10 and the external apparatus wirelessly without the AP. The wireless communication module may be implemented to support Wi-Fi direct, BT, BLE, or the like communication method. When the electronic apparatus 10 performs direct communication with the external apparatus, the storage 130 may be configured to store identification information (e.g., media access control (MAC) address or Internet protocol (IP) address) about the external apparatus with which the communication will be performed.

In the electronic apparatus 10 according to an embodiment of the disclosure, the wireless interface 122 is configured to perform wireless communication with the external apparatus by at least one of the WLAN unit and the wireless communication module according to its performance.

According to an alternative embodiment, the wireless interface 122 may further include a communication module based on various communication methods such as long-term evolution (LTE) or the like mobile communication, electro-magnetic (EM) communication including a magnetic field, visible light communication (VLC), etc.

The wireless interface 122 may wirelessly communicate with the external apparatus such as the server on the network, thereby transmitting and receiving a data packet to and from the external apparatus.

The wireless interface 122 may include an IR transmitter and/or an IR receiver to transmit and/or receive an infrared (IR) signal according to IR communication standards. The wireless interface 122 may receive or input a signal from the input device 20 such as the remote control or other external apparatuses or transmit or output a signal to other external apparatuses through the IR transmitter and/or IR receiver. Alternatively, the electronic apparatus 10 may exchange a signal with the input device 20 or other external apparatuses through the wireless interface 122 based on another method such as Wi-Fi, BT, etc.

According to an embodiment, the wireless interface 122 may transmit predetermined data as information about a user voice received through the microphone or the like voice input to the server or the like external apparatus. Here, there are no limits to the format/kind of data to be transmitted, and the data may, for example, include an audio signal corresponding to a voice uttered by a user, voice features extracted from the audio signal, etc.

Further, the wireless interface 122 may receive data based on a processing result of a corresponding user voice from the server or the like external apparatus. The electronic apparatus 10 may output a sound corresponding to the voice processing result through an internal or external loudspeaker, based on the received data.

However, the foregoing embodiment is merely an example, and the user voice may be processed by the electronic apparatus 10 without being transmitted to the server. In other words, according to an alternative embodiment, the electronic apparatus 10 may be implemented to serve as a speech-to-text (STT) server.

The electronic apparatus 10 may communicate with the remote control or the like input device 20 through the wireless interface 122, and receive a sound signal corresponding to the user voice from the input device.

In the electronic apparatus 10 according to an embodiment, a communication module for communicating with the server or the like external apparatus and a communication module for communicating with the input device 20 such as the remote control may be different from each other. For example, the electronic apparatus 10 may use an Ethernet modem or a Wi-Fi module to communicate with the external apparatus, and use a Bluetooth module to communicate with the input device 20.

In the electronic apparatus 10 according to an alternative embodiment, a communication module for communicating with the server or the like external apparatus and a communication module for communicating with the input device 20 such as the remote control may be the same with each other. For example, the electronic apparatus 10 may use the Bluetooth module to communicate with the external apparatus and the input device 20.

According to an embodiment, the wireless interface 122 may be built-in the electronic apparatus 10 or implemented as a dongle or a module and detachably connected to the connector of the electronic apparatus 10.

According to an embodiment, the interface 110 may receive a signal corresponding to a user's operation from the input device 20. The signal received through the interface 110 is transmitted to the processor 140, and the processor 140 may perform an operation corresponding to the instruction indicated by the received signal.

The electronic apparatus 10 may include a storage 130.

The storage 130 may be configured to store various pieces of data of the electronic apparatus 10.

The storage 130 may be implemented by a nonvolatile memory (or a writable read only memory (ROM)) which can retain data even though the electronic apparatus 10 is powered off, and mirror changes. That is, the storage 130 may include one among a flash memory, an HDD, an erasable programmable ROM (EPROM) or an electrically erasable programmable ROM (EEPROM). The storage 130 may further include a volatile memory such as a dynamic random-access memory (DRAM) or a static random-access memory (SRAM), of which reading or writing speed for the electronic apparatus 10 is faster than that of the nonvolatile memory.

Data stored in the storage 130 may for example include not only an OS for driving the electronic apparatus 10 but also various programs, applications, image data, appended data, etc. executable on the OS.

Specifically, the storage 130 may be configured to store a signal or data input/output corresponding to operations of the elements under control of the processor 140. The storage 130 may be configured to store a control program for controlling the electronic apparatus 10, an application provided by the manufacturer or downloaded from the outside, a relevant UI, graphics or images for providing the UI, user information, documents, databases, or the concerned data.

According to an embodiment, an image displayed in the electronic apparatus 10 may be based on data stored in a flash memory, a hard disk, or the like nonvolatile storage 130. The storage 130 may be provided inside or outside the electronic apparatus 10, and the storage 130 provided outside may be connected to the electronic apparatus 10 via the wired interface 121.

According to an embodiment of the disclosure, the term 'storage' is defined to include the storage 130, the ROM (not shown) in the processor 140, a RAM (not shown) or a memory card (not shown, e.g., a micro-SD card, a memory stick, etc.) mountable to the electronic apparatus 10.

According to an embodiment, the storage 130 may store a TV application or TV client as a program that turns the electronic apparatus 10 into a TV, a video on demand (VOD) application as a program that plays content received from the server or the like external device, etc.

The electronic apparatus 10 may include the processor 140.

The processor 140 performs control for operating general elements of the electronic apparatus 10. The processor 140 may include a control program (or an instruction) to perform such a control operation, a nonvolatile memory in which the control program is installed, a volatile memory to which at least a part of the installed control program is loaded, and at least one of general-purpose processors such as a microprocessor, an application processor or a central processing unit (CPU) that executes the loaded control program.

The processor 140 may include a single-core processor, a dual-core processor, a triple-core processor, a quad-core processor, or the like multiple-core processor. The processor 140 may include a plurality of processors, for example, a main processor and a sub processor that operates in a sleep mode (e.g., when the display apparatus is supplied with only standby power and does not serve to display an image). Further, the processor, the ROM, and the RAM are connected to one another through an internal bus.

According to an embodiment, the processor 140 may include an image processor that performs various preset processes with respect to a content signal received from sources. The processor 140 outputs an output signal generated or combined by performing an image process to the display 110, so that an image corresponding to an image signal can be displayed on the display 110.

The image processor includes a decoder for decoding an image signal to have a predetermined image format of the electronic apparatus 10, and/or a scaler for adjusting an image signal to match the output format of the display 110. According to an embodiment, the decoder may for example be implemented by an H.264/AVC decoder, but not limited thereto. In other words, the video decoder in this embodiment may for example be implemented by a moving picture experts group (MPEG) decoder, a high efficiency video codec (HEVC) decoder, or the like decoders corresponding to various compression standards.

The decoder may be implemented as a hardware decoder or a software decoder. According to an embodiment, the electronic apparatus 10 may include a plurality of decoders. Here, the plurality of decoders provided in the electronic apparatus 10 may be each implemented as the hardware decoder or the software decoder. There are no limits to the number and/or types of decoder provided in the electronic apparatus 10 according to the disclosure.

There are no limits to the kinds of content to be processed by the image processor according to the disclosure. For example, the content to be processible in the image processor may include not only a moving picture like a video, but also a picture of joint photographic experts group (JPEG) file, a still image of a background, and a menu item of a UI, etc.

Here, there are no limits to the kinds of video processing process performed in the image processor of the disclosure. For example, the image processor may for example perform at least one of various processes such as de-interlacing for converting an interlaced broadcast signal into a progressive broadcast signal, noise reduction for improving image quality, detail enhancement, frame refresh rate conversion, line scanning, etc.

According to an embodiment, the image processor may be implemented by a video board including circuit elements such as various chipsets for performing respective processes, a memory, electronic parts, wirings, etc. which are mounted on to a printed circuit board (PCB). In this case, the processor 140 including a tuner and an image processor of the electronic apparatus 10 may be provided on a single video board. Of course, this is merely an example, and they may be arranged on a plurality of PCBs connecting and communicating with each other.

According to an embodiment, the processor 140 may be implemented as included in the main SoC mounted to the PCB internally provided in the electronic apparatus 10.

The control program may include a program(s) achieved by at least one of a BIOS, a device driver, an OS, a firmware, a platform, or an application. According to an exemplary embodiment, the application program may be previously installed or stored in the electronic apparatus 10 when the electronic apparatus 10 is manufactured, or may be installed in the electronic apparatus 10 on the basis of application data received from the outside when it is required in the future. The application data may for example be downloaded from an external server such as an application market to the electronic apparatus 10. Such an external server is merely an example of the computer program product according to the disclosure, but not limited thereto.

The control program may be recorded in a storage medium readable by a machine such as a computer. The machine-readable storage medium may be provided in the form of a non-transitory storage medium or a non-volatile storage medium. Here, the term 'non-transitory storage medium' means a tangible device and does not include a signal (e.g., an electromagnetic wave), and this term does not distinguish between a case where data is semi-permanently stored in the storage medium and a case where data is temporarily stored. For example, the 'non-transitory storage medium' may include a buffer in which data is temporarily stored.

In the electronic apparatus 10 according to an embodiment, the processor 140 may process a broadcast signal so that an image of a predetermined channel can be displayed based on that signal. Further, the processor 140 may process a signal received from the server or the like external device through the interface 120 so that an image of predetermined content can be displayed based on that signal.

According to an embodiment, the processor 140 may control the character input keyboard 300, in which the plurality of character keys are arranged, to be displayed on the display 110.

The processor 140 may control the display 110 to display an image of the character input keyboard 300 to be merged with an image being displayed or overlaid on an image being displayed in the form on screen display (OSD) or user interface (UI). According to an embodiment, the processor 140 may control the overlaid character input keyboard 300 to be displayed with adjusted transparency.

According to an embodiment, a user may operate the keys or buttons, for example, the four arrow buttons 211, 212, 213, and 214 of the input device 20 to move the cursor to a desired character, and operate the enter button 225 to select at least one character key while the character input keyboard 300 is being displayed on the display 110, thereby typing a text including the character corresponding to that character key.

The processor 140 performs the input operation for the character corresponding to the character key pointed by the cursor among the plurality of character keys of the character input keyboard 300, based on the movement and selection instructions received from the input device 20, thereby typing the test including that character.

Figure 3:
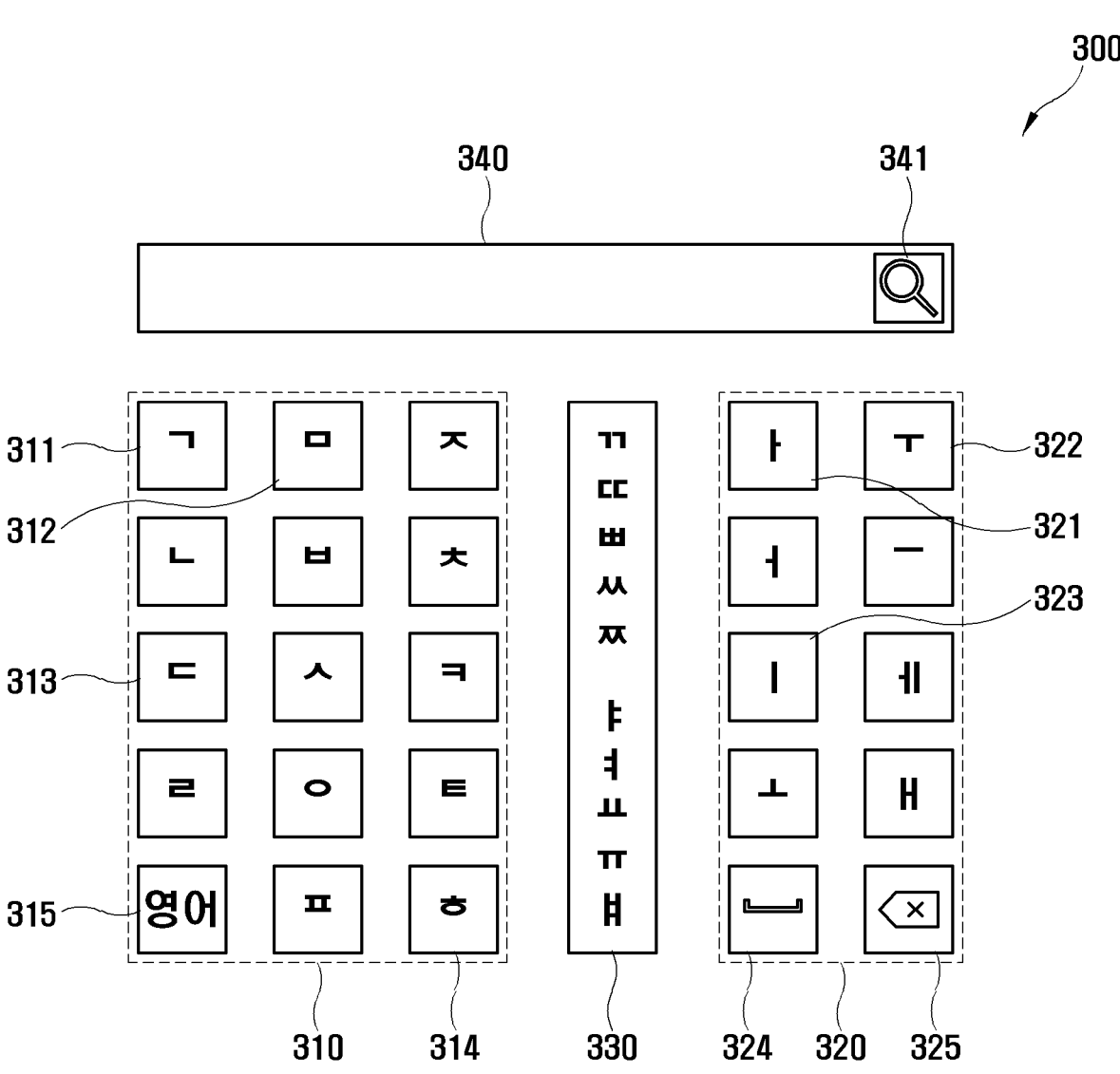
FIG. 3 illustrates an initial screen of a character input keyboard according to an embodiment of the disclosure.

FIG. 3 illustrates an initial screen of a character input keyboard according to an embodiment of the disclosure.

As shown in FIG. 3, the electronic apparatus 10 according to an embodiment displays the character input keyboard 300 including the plurality of character keys corresponding to the plurality of characters to input the plurality of characters of a certain language. In a certain language, a plurality of characters are combined into a syllable, and a single syllable or a plurality of syllables come together to form a word. In this embodiment, for convenience, the "character" will be described as a part that makes up the syllable. The character may be classified into two categories of a first character group and a second character group, according to a predetermined criterion. The characters included in the first character group are not included in the second character group, and the characters included in the second character group are not included in the first character group. In other words, one character is included in only one of the first character group and the second character group, and is not included in both the first character group and the second character group at the same time.

Here, at least one of the plurality of characters included in the first character group and at least one of the plurality of characters included in the second character group are selected, and the selected characters are combined to form one syllable. For example, one syllable may be formed by combination between one character of the first character group and one character of the second character group, combination between two characters of the first character group and one character of the second character group, combination between one character of the first character group and two characters of the second character group, etc. Further, at least one of the first character group and the second character group may include a plurality of sub-character groups, and one character is included in only one sub-character group of the first character group or the second character group.

Referring to FIG. 3 in consideration of the foregoing descriptions, the character input keyboard 300 may include a plurality of key areas, for example, a first key area 310 and a second key area 320, in which the character keys are arranged.

According to an embodiment, for example, the plurality of key areas 310 and 320 may be disposed on the left and right sides of the screen, respectively. In other words, the first key area 310 and the second key area 320 may be arranged in a first direction (or horizontal direction).

The plurality of key areas 310 and 320 may be designed to be disposed on the upper and right sides of the screen. In other words, the first key area 310 and the second key area 320 may be arranged in a second direction (or vertical or horizontal direction).

The plurality of key areas 310 and 320 may include the character keys arranged in the form of a matrix. Referring to FIG. 3, for example, the first key area 310 may include the character keys arranged in a 3×5 matrix, and the second key area 320 may include the character keys arranged in a 2×5 matrix. FIG. 3 shows an example of the character input keyboard 300, and the number and positions of key areas, and the number and layout of character keys in each key area are not limited to this example.

According to an embodiment, the character keys corresponding to the first character group are arranged in the first key area 310, and the character keys corresponding to the second character group are arranged in the second key area 320. According to an embodiment, one character may be assigned to each character key in the plurality of key areas 310 and 320.

According to an embodiment, the character input keyboard 300 may include a conversion key 330 disposed adjacent to at least one of the plurality of key areas 310 and 320. For instance, the conversion key 330 may be disposed between the first key area 310 and the second key area 320.

The conversion key 330 may be provided to perform a predefined input operation for the character corresponding to the character key selected from the adjacent key area, i.e., one of the plurality of key areas 310 and 320. Here, a predefined input operation includes conversion from a first character corresponding to the selected character key into a second character related to the first character. In other words, the first character may be converted into a preset second character, for example, a single letter may be converted into a combining letter (i.e., a letter made up of the same or different letters), based on a user' input for the conversion key 330.

According to an embodiment, the character input keyboard 300 may additionally include keys for various functions in addition to the character keys. For example, the character input keyboard 300 may include a switching key 315 for switching a language being currently used over to another language, a space key 324 for inserting a space character between a syllable and a syllable or between a word and a word, a delete key (or backspace key) 325 for deleting the previously input syllable or character, a search key 341 for performing a searching function based on an input word, etc. Besides the foregoing examples, the character input keyboard 300 may include additional keys for various functions.

According to an embodiment, at least some function keys may be included in one of the plurality of key areas 310 and 320. For example, the switching key 315 may be included in the first key area 310, and the space key 324 and the delete key 325 may be included in the second key area 320. Further, a specific function key, for example, the search key 341 may be provided on one side of an input window 340 that displays a result of inputting a character. The layout of such function keys is merely an example, and the function keys may be designed to be arranged or added to at various positions inside or outside the character input keyboard 300.

The cursor (or pointer) may be displayed as overlaid on the character input keyboard 300. According to an embodiment, the cursor may be represented by highlighting a key corresponding to its current position on the character input keyboard 300. The movement of the cursor on the character input keyboard 300 corresponds to the input of the four arrow buttons 211, 212, 213, and 214 of the input device 20.

According to an embodiment, in response to a user input made once for one of the four arrow buttons 211, 212, 213, and 214, the cursor may move once in the direction indicated by the input one of the four arrow buttons 211, 212, 213, and 214. For example, the cursor may move from one key on the character input keyboard 300 to the next adjacent key in the corresponding direction when moved once.

According to an embodiment, the cursor may move from a predetermined initial position on the character input keyboard 300 in response to the input for the four arrow buttons 211, 212, 213, and 214. The initial position may be any one key such as, but not limited to, the first character key, "ㄱ" 311 within the plurality of key areas 310 and 320.

Hereinafter, it will be described by way of example that the character input keyboard 300 corresponds to Hangul (Korean alphabet). However, the character input keyboard 300 according to this embodiment does not only correspond to Hangul, but may be designed to be applied to the characters other than Hangul.

In Hangul, a syllable is made up in the form of "initial consonant letter-middle vowel letter-final consonant letter" or "initial consonant letter-middle vowel letter". Consonants are used for the initial and final letters, and vowels are used for the middle letter. As the characters that belong to the consonants, that is, the characters that are included in a consonant group, there are single consonants of "ㄱ, ㄴ, ㄷ, ㄹ, ㅁ,ㅂ, ㅅ, ㅇ, ㅈ, ㅊ, ㅋ, ㅌ,ㅍ, and ㅎ" and combining letters, i.e., double consonants of "ㄲ, ㄸ, ㅃ, ㅆ, and ㅉ". As the characters that belongs to vowels, that is, the characters that are included in a vowel group, there are monophthongs of "ㅏ, ㅓ, ㅗ, ㅜ,ㅡ, ㅣ, ㅐ, and ㅔ" and the combining letter, i.e., diphthongs of "ㅑ, ㅕ, ㅛ, ㅠ, ㅒ, and ㅖ".

When the foregoing definition of the character classification is applied to Hangul, the first character group corresponds to the consonant group, and the second character group corresponds to the vowel group. Because the consonants are used for the initial and final letters and vowels are used for the middle letters in Hangul, the syllable is formed by a combination of "at least one character (i.e., consonant) of the first character group" and "at least one character (i.e., vowel) of the second character group". In the following embodiments, for convenience, the first character group for Hangul will be referred to as the consonant group, and the second character group will be referred to as the vowel group.

Among the plurality of key areas 310 and 320, the first key area 310 may be arranged with the character keys corresponding to the first character group, i.e., the consonant group. According to an embodiment, character keys 311, 312, 313, and 314 of "ㄱ, ㄴ, ㄷ, ㄹ, ㅁ, ㅂ, ㅅ, ㅇ, ㅈ, ㅊ, ㅋ, ㅌ, ㅍ, ㅎ" corresponding to the single consonants may be arranged in the first key area 310. The character keys 311, 312, 313, and 314 may be arranged in the first key area 310 in the form of a matrix (e.g., 3×5), and the number of matrices may be based on the number of character keys 311, 312, 313, and 314, the aspect ratio of the display 110, etc. Further, the character keys 311, 312, 313, and 314 may be arranged in the first key area 310 in a general consonant order, but this is merely an example and may be designed to be arranged in various orders. For instance, the character keys corresponding to frequently used characters, or related characters, for example, single characters (i.e., single consonants) that are convertible into double consonants or the like combining letters, may be arranged adjacent to the conversion key 330.

Among the plurality of key areas 310 and 320, the second key area 320 may be arranged with the character keys corresponding to the second character group, i.e., the vowel group. According to an embodiment, the character keys 321, 322, and 323 of "ㅏ, ㅓ, ㅗ, ㅜ, ㅡ, ㅣ, ㅐ, ㅔ" corresponding to the monophthongs may be arranged in the second key area 320. The character keys 321, 322, and 323 may be arranged in the second key area 320 in the form of a matrix (e.g., 2×5), and the number of matrices may be based on the number of character keys 321, 322, and 323, the aspect ratio of the display 110, etc. Further, the character keys 321, 322, and 323 may be arranged in the second key area 320 in a general vowel order, but this is merely an example and may be designed to be arranged in various orders. For instance, the character keys corresponding to frequently used characters, or related characters, for example, single characters (i.e., monophthongs) that are convertible into diphthongs or the like combining letters, may be arranged adjacent to the conversion key 330.

The conversion key 330 may be disposed between the first key area 310 and the second key area 320. According to an embodiment, when the character key of the first key area 310 or the second key area 320 is selected and then the conversion key 330 is selected, a first character corresponding to the selected character key may be converted into a second character associated with the first character. Here, the first character and the second character are previously defined as related characters having a relationship, in particular, a relationship between the single letter and the combining letter, i.e., between the single consonant and the double consonant or between the monophthong and the diphthong.

For example, when the character key of the first key area 310, for example, the character key 311 of the single consonant " ㄱ " is selected and the conversion key 330 is subsequently selected, the first character corresponding to the selected character key 311, i.e., the single consonant " ㄱ " may be converted into the second character associated with the first character, i.e., the double consonant " ㄲ ". As another example, when the character key of the second key area 320, for example, the character key 321 of the monophthong " ㅏ " is selected and the conversion key 330 is subsequently selected, the first character corresponding to the selected character key 321, i.e., the monophthong " ㅏ " may be converted into the second character associated with the first character, i.e., the diphthong " ㅑ ".

According to an embodiment, the convertible second characters, for example, the characters of " ㄲ, ㄸ, ㅃ, ㅆ, ㅉ, ㅑ, ㅕ, ㅛ, ㅠ, ㅒ ", i.e., the combining letters such as the double consonants or the diphthongs may be displayed within the area of the conversion key 330.

According to an embodiment, the conversion key 330 may be implemented as a button of a long bar, such as a horizontal bar or a vertical bar, extending in either a first direction (e.g., horizontal direction) or a second direction (e.g., vertical direction) perpendicular to the first direction.

Specifically, referring to FIG. 3, the conversion key 330 may be shaped like a bar extending in the second direction (e.g., vertical direction) perpendicular to the first direction (e.g., horizontal direction) in which the first key area 310 and the second key area 320 are arranged.

According to an embodiment, the length of the conversion key 330 in the extending direction, i.e., the second direction may correspond to that of the first key area 310 or the second key area 320. For example, referring to FIG. 3, when the conversion key 330 is implemented as a vertical bar extending in the second direction (e.g., vertical direction), the length of the conversion key 330 in the second direction may correspond to the length in the second direction, i.e., the vertical length of the first key area 310 and the second key area 320.

Due to the syllable characteristics of Hangul in which a single character syllable is formed in the manner of "initial consonant letter-middle vowel letter-final consonant letter" or "initial consonant letter-middle vowel letter", a user cannot select the character keys of the characters making up a word desired to be typed at once on the character input keyboard 300, but rather selects the character keys in sequence by moving the cursor through the four arrow buttons 211, 212, 213, and 214 of the input device 20. Therefore, it is necessary to reduce the number of operations for the four arrow buttons 211, 212, 213, and 214, while quickly and easily moving the cursor to the character key desired by a user.

Taking this necessity into account, according to an embodiment of the disclosure, the character input keyboard 300 is divided into the first key area 310 for the consonant group and the second key area 320 for the vowel group, and the bar-shaped conversion key 330 is disposed between the first key area 310 and the second key area 320. Further, the character keys corresponding to the single consonants are arranged in the first key area 310, and the character keys corresponding to the monophthongs are arranged in the second key area 320, so that the number of character keys can be reduced. In addition, the conversion key 330 is used to convert the single letter, i.e., the single consonant or the monophthong, into the combining letter, i.e., the double consonant or the diphthong, and at the same time, move between the consonants and the vowels, thereby reducing the number of operations for the four arrow buttons 211, 212, 213, and 214, and improving the convenience of use.

Figure 4:
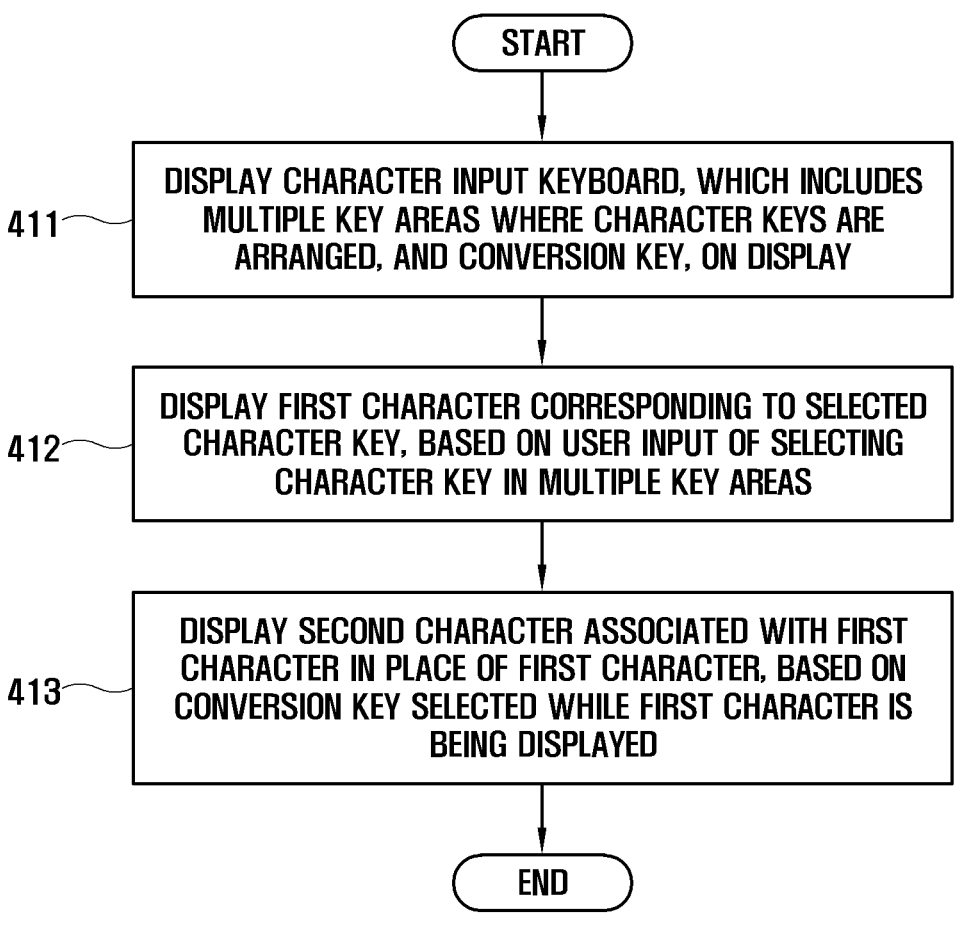
FIG. 4 is a flowchart showing how to control an electronic apparatus according to an embodiment of the disclosure.

FIG. 4 is a flowchart showing how to control an electronic apparatus according to an embodiment of the disclosure.

Referring to FIGS. 3 and 4, in the electronic apparatus 10 according to an embodiment, the processor 140 may, at operation 411, display on the display 110 the character input keyboard 300 including the plurality of key areas 310 and 320 and the conversion key 330 where the plurality of character keys are arranged corresponding to the plurality of characters of a specific language.

The plurality of key areas 310 and 320 include the first key area 310 in which the character keys 311, 312, 313, and 314 are arranged corresponding to the first character group, for example, the consonant group, and the second key area 320 in which the character keys 321, 322, and 323 are arranged corresponding to the second character group, for example, the vowel group, and the conversion key 330 may be disposed between the first key area 310 and the second key area 320. Further, the character input keyboard 300 may include the cursor for pointing any one of the plurality of character keys. Further, the character input keyboard 300 may include the input window 340 that displays the result of inputting or selecting the character key.

The processor 140 may, at operation 412, display the first character corresponding to the selected character key, based on a user input using the interface 120 to select the character key in the plurality of key areas 310 and 320, i.e., the first key area 310 or the second key area 320.

FIGS. 5 to 8 illustrate examples of inputting characters in sequence through a character input keyboard according to an embodiment of the disclosure.

Figure 5:
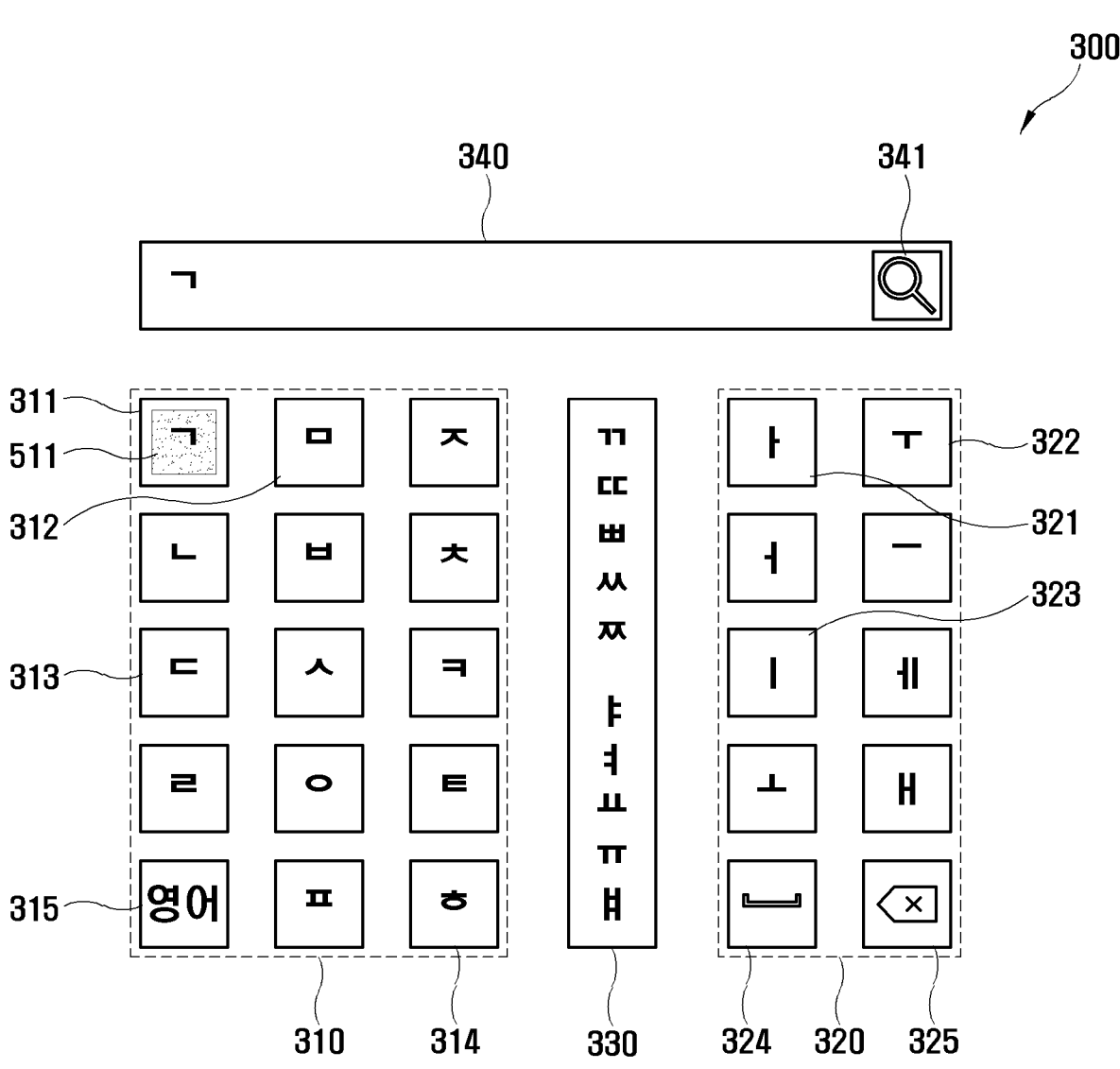
FIGS. 5 to 8 illustrate examples of inputting characters in sequence through a character input keyboard according to an embodiment of the disclosure.

Referring to FIG. 5, while the character input keyboard 300 is being displayed on the display 110, a user may make a first user input for selecting the character key 311 by operating the four arrow buttons 211, 212, 213, and 214 of the input device 20 to position the cursor 511 on one character in either the first key area 310 or the second key area 320 of the character input keyboard 300, for example, the character key 311 of " ㄱ " in the first key area 310, and then pressing the enter button 225. The processor 140 may control the input window 340 to display the first character "ㄱ" corresponding to the selected character key, for example, the character key 311 of "ㄱ", as an input result based on the first user input.

Referring to FIG. 4, the processor 140 may, at operation 413, display the second character associated with the first character in place of the first character based on the conversion key 330 selected while the first character is being displayed.

Figure 6:
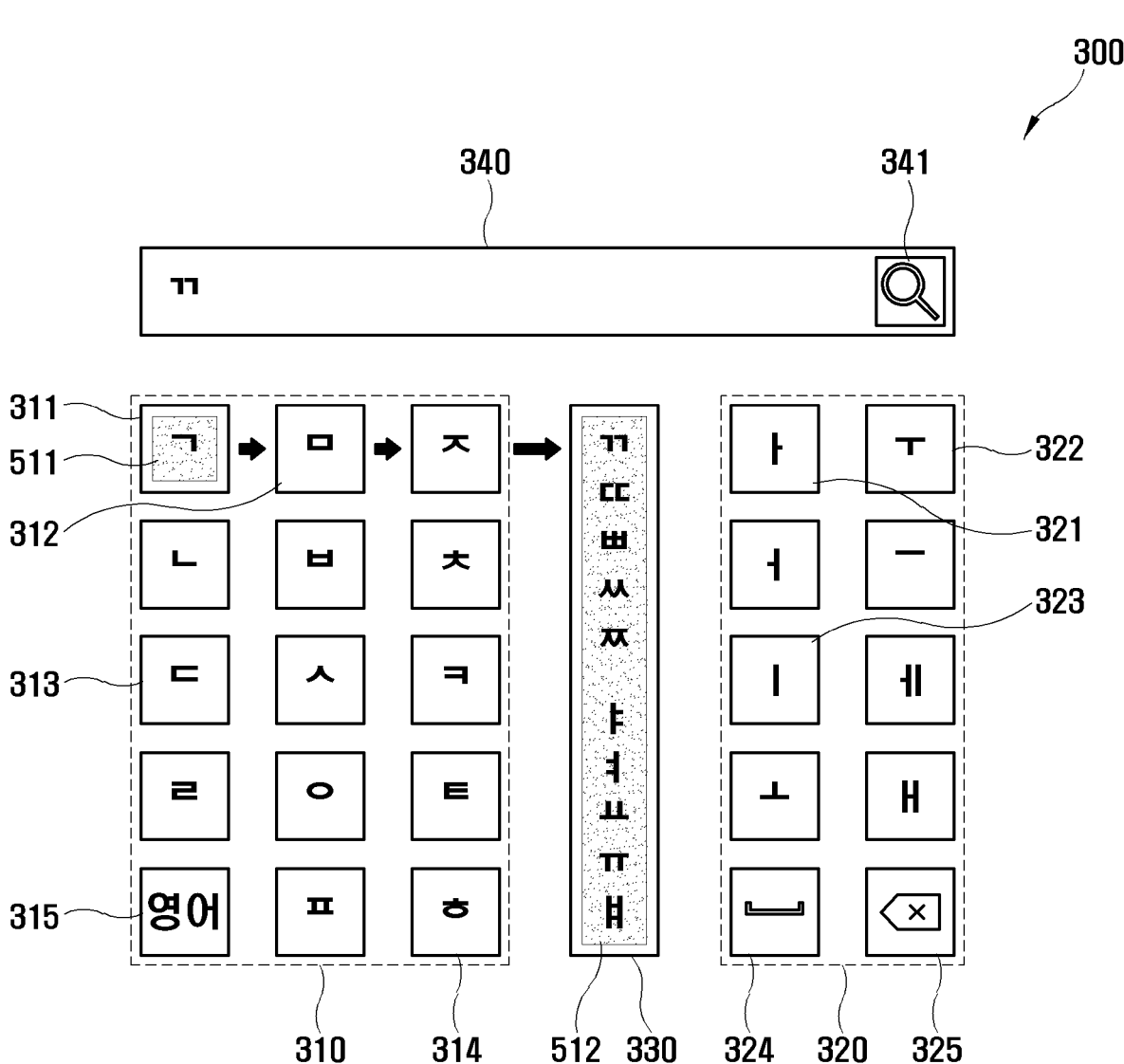

Specifically, while the cursor 511 is positioned at the character key 311 of "ㄱ" and the corresponding first character "ㄱ" is displayed in the input window 340 as shown in FIG. 5, a user may make a second user input for selecting the conversion key 330 of the character input keyboard 300 by operating the four arrow buttons 211, 212, 222, and 204 of the input device 20 to position the cursor 512 on the conversion key 330, and pressing the enter button 225 as shown in FIG. 6. Here, a user may select the conversion key 330 after moving the cursor 512 from the character key 311 of "ㄱ" to the conversion key 330 by operating the right button 212 corresponding to a rightward movement (e.g., three operations).

Here, the processor 140 may receive the second user input of selecting the conversion key 330 in the operation 413 in succession to the first user input of selecting the character key 311 of "ㄱ" in the operation 412. In other words, as a selection input resulting from pressing the enter button 225, the second user input is received consecutively to the first user input. In other words, the processor 140 may perform operations (e.g., input and display operations) for the second character previously defined for the first character in place of the first character corresponding to the selected character key 311, based on the character key 311 selected in the operation 412 (i.e., the first user input) and the conversion key 330 selected in the operation 413 (i.e., the second user input).

According to an embodiment, the second character is defined as the character associated with the first character corresponding to the selected character key, that is, the combining letter to the first character, i.e., the single letter. For example, when the first character is the single consonant such as "ㄱ", the second character is the combining letter to the first character, i.e., the double consonant "ㄲ".

Referring to FIG. 6, the processor 140 may control the operation (e.g., input and display operations) to be performed for the second character, i.e., the combining letter (the double consonant) "ㄲ" associated with the first character, i.e., "ㄱ" corresponding to the selected character key 311, based on the second user input for selecting the conversion key 330 in succession to the first user input for selecting the character key 311 of "ㄱ" while the first character "ㄱ" is being displayed in the input window 340. Accordingly, the processor 140 may display the second character "ㄲ" associated with the first character in place of the first character "ㄱ" as an input result in the input window 340, based on the second user input.

According to an embodiment of the disclosure, the foregoing operations 411 to 413 of inputting the characters may be performed successively/repetitively.

Figure 7:
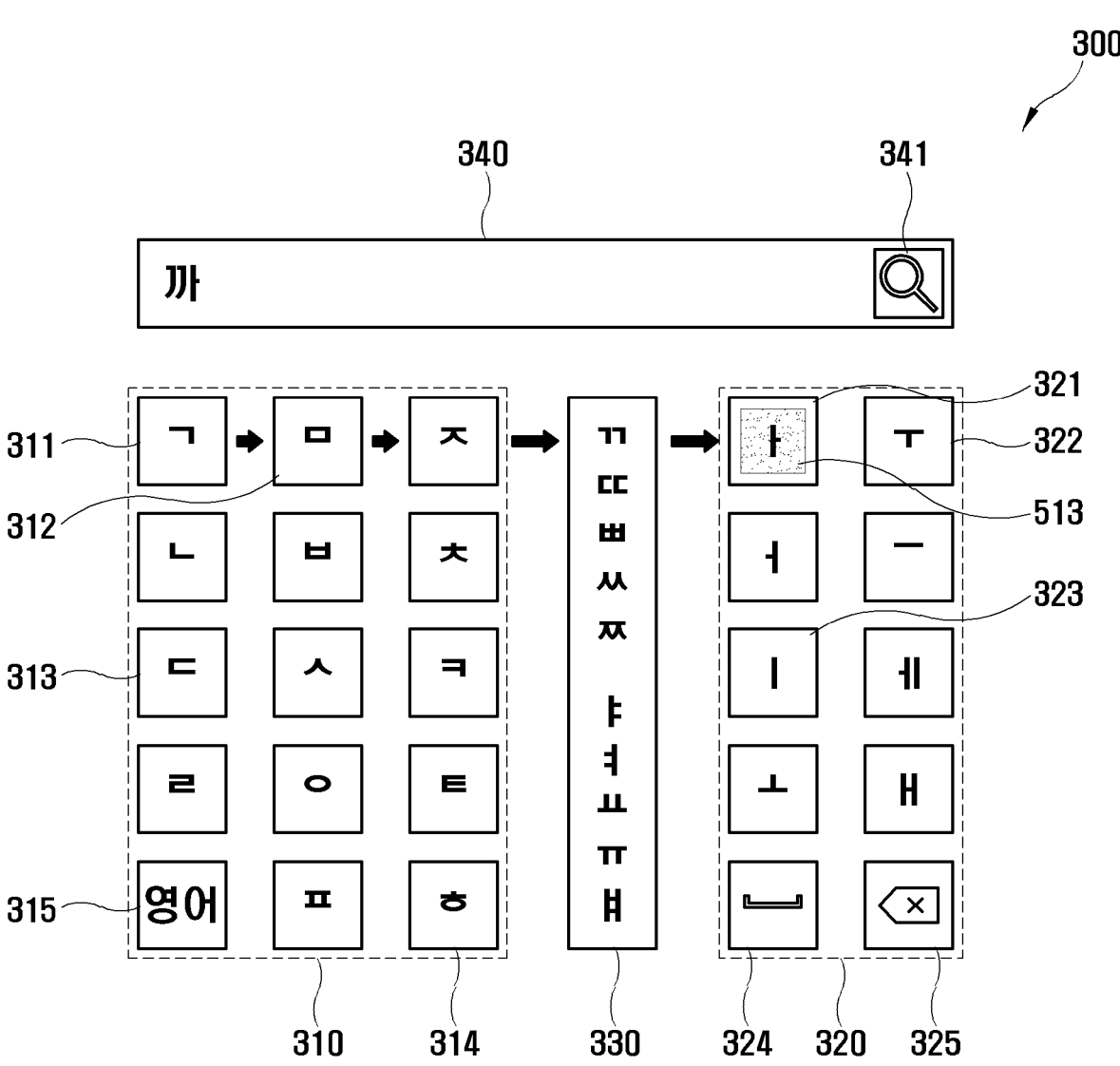

Referring to FIG. 7, while the character input keyboard 300 is being displayed on the display 110 in the operation 411, the processor 140 may, at operation 412, receive the first user input of selecting the corresponding characteristic key 321 by pressing the enter button 225 while positioning the cursor 513 on any one character in either the first key area 310 or the second key area 320 of the character input keyboard 300, for example, the character key 321 of "ㅏ" in the second key area 320 as a user operates the four arrow buttons 211, 212, 213, and 214 of the input device 20, and display the first character "ㅏ" corresponding to the character key selected based on the first user input, for example, the character key 321 of "ㅏ" as an input result in the input window 340. Here, a user may operate the right button 212 corresponding to a rightward movement once to move the cursor 513 to the character key 321 of "ㅏ" as shown in FIG. 7 while the cursor 512 is positioned at the conversion key 330 as shown in FIG. 6, and then press the enter button 225, thereby making the first user input.

Figure 8:
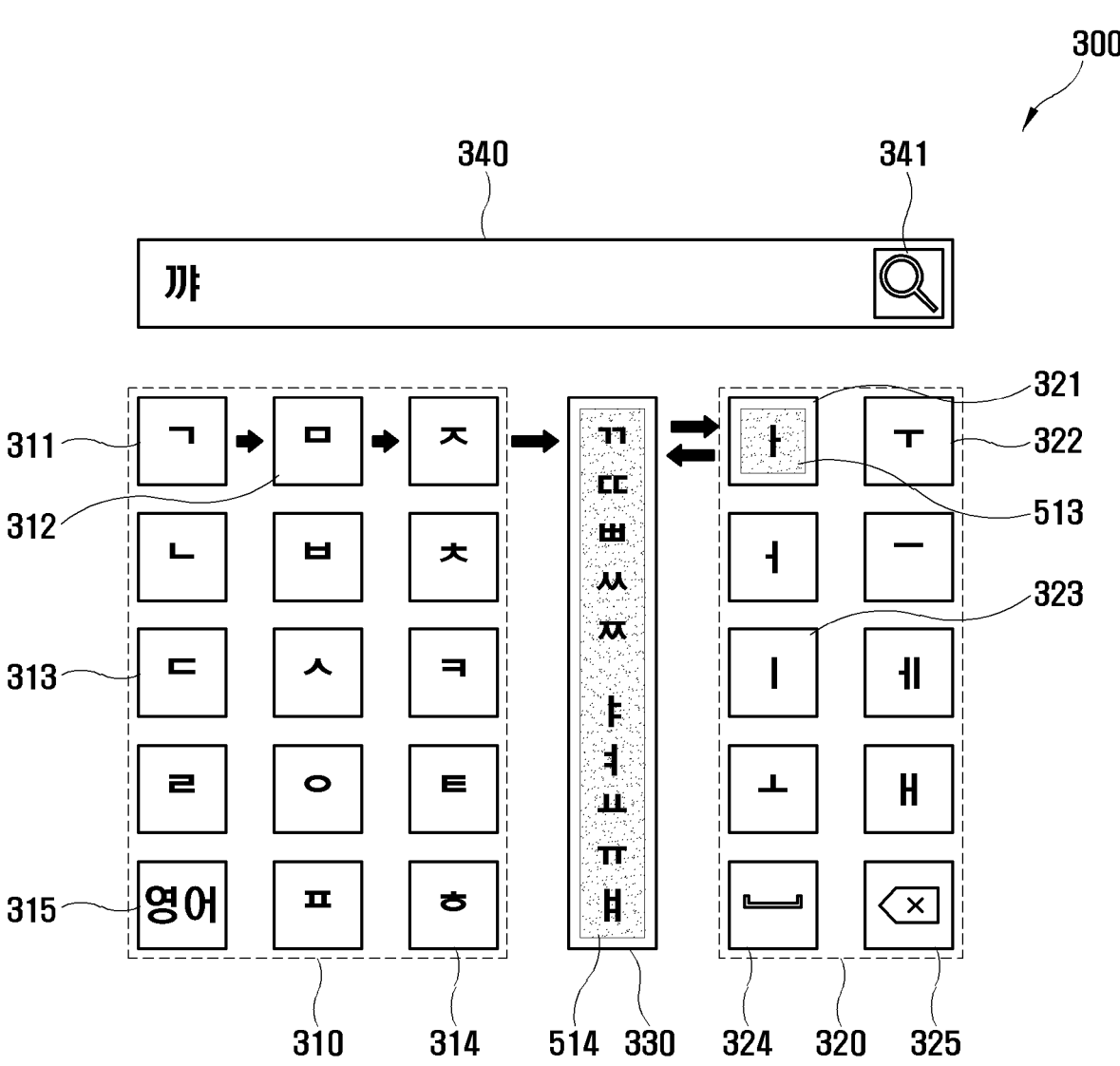

Referring to FIG. 8, the processor 140 may, at operation 413, continue to receive the second user input of selecting the conversion key 330 by pressing the enter button 225 while positioning the cursor 514 on the conversion key 330 of the character input keyboard 300 as a user operates the four arrow buttons 211, 212, 213, and 214 of the input device 20, and to display the second character "ㅑ" associated with the first character in place of the first character "ㅏ" based on the second user input. Here, a user may select the conversion key 330 after moving the cursor 514 to the conversion key 330 by operating the left button 211 corresponding to a leftward movement once while the cursor 513 is positioned on the character key 321 of "ㅏ".

In other words, based on the character key 321 selected in the operation 412 (the first user input) and the conversion key 330 selected in subsequent operation 413 (the second user input), the processor 140 may perform the operations (e.g., input and display operations) for the second character associated with the first character in place of the first character corresponding to the selected character key 321. For example, when the first character is a monophthong such as "ㅏ", the second character is the combining letter, i.e., the diphthong "ㅑ" to the first character.

Referring to FIG. 8, the processor 140 may control the operations to be performed for the combining letter (i.e., diphthong) "ㅑ" as the second character predefined for (associated with) the first character corresponding to the selected character key 321, i.e., "ㅏ", based on the second user input of selecting the conversion key 330 in succession to the first user input of selecting the character key 321 of "ㅏ". Accordingly, the input window 340 displays "까" as the input result based on the combination of the second character "ㄲ" and "ㅑ".

According to the foregoing embodiment of the disclosure, the conversion key 330 for the input operation (conversion) of the character associated with the selected character, i.e., the related character is disposed adjacent to the first key area 310 and the second key area 320 where the plurality of character keys are arranged, and is thus convenient for a user to type a text because a distance of moving the cursor and the number of operations for the four arrow buttons 211, 212, 213, and 214 are reduced.

The foregoing embodiment relates to how to perform the character input operation by selecting the character key in a specific key area and then operating the four arrow buttons 211, 212, 213, and 214 of the input device 20 to move the cursor to the adjacent keys in sequence. However, the cursor may be designed to automatically move to the conversion key 330 or to the character key in another key area depending on the situations, thereby reducing the number of operations for the four arrow buttons 211, 212, 213, and 214. These embodiments will be described below.

Figure 9:
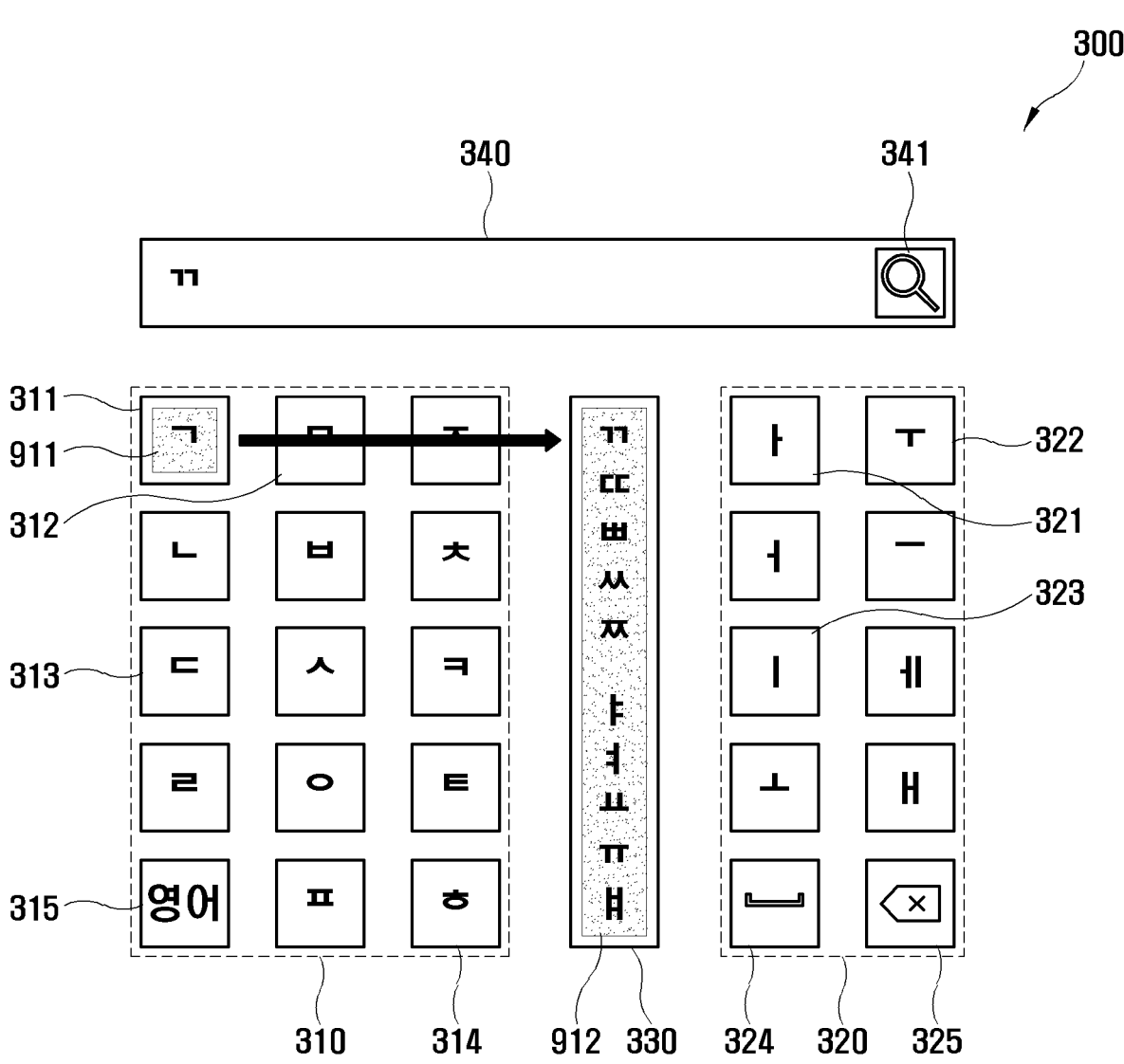
FIGS. 9 and 10 illustrate examples of inputting characters by moving a cursor on a character input keyboard according to an embodiment of the disclosure.
Figure 10:
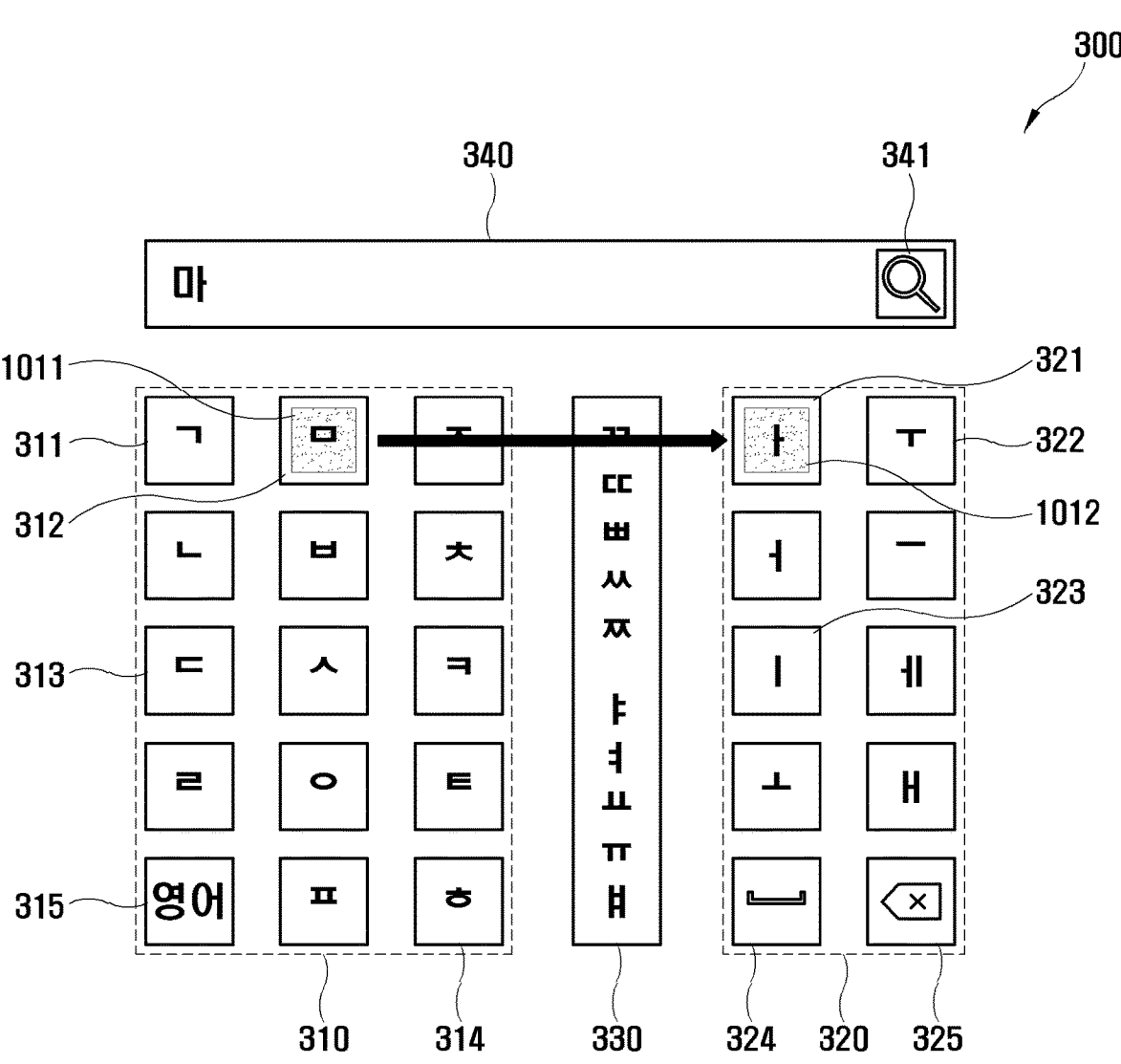

FIGS. 9 and 10 illustrate examples of inputting characters by moving a cursor on a character input keyboard according to an embodiment of the disclosure.

Referring to FIG. 9, while the character input keyboard 300 is being displayed on the display 110, the processor 140 may receive the first user input of selecting the corresponding character key 311 by positioning the cursor 911 on any one character in either the first key area 310 or the second key area 320 of the character input keyboard 300, for example, the character key 311 of " ㄱ " in the first key area 310 as a user operates the four arrow buttons 211, 212, 213, and 214 of the input device 20, and pressing the enter button 225.

According to an embodiment, the processor 140 may control the cursor 912 to be displayed as moved to the conversion key 330 based on the receipt of the first user input of selecting the character key 311 in either the first key area 310 or the second key area 320.

Here, the processor 140 may control the cursor 912 to move automatically and directly to the conversion key 330 based on identification that the second character (e.g., the combining letter (or double consonant or diphthong) predefined for (associated with) the first character corresponding to the character key 311 selected by the first user input is present.

According to an embodiment, the processor 140 may also control the cursor 912 to be displayed as moved to the conversion key 330, based on the receipt of the first user input of selecting the character key 311, and a single operation for any one of the four arrow buttons 211, 212, 213, and 214, for example, the right button 212.

Here, the processor 140 may control the cursor 912 to move directly to the conversion key 330 depending on the single operation of the right button 212, in the state that the character key 311 is selected, based on the identification that the second character (e.g., the combining letter (double consonant or diphthong) predefined for (associated with) the first character corresponding to the character key 311 selected by the first user input is present.

Referring to FIG. 10, while the character input keyboard 300 is being displayed on the display 110, the processor 140 may receive the first user input of selecting the corresponding character key 312 by positioning the cursor 1011 on any one character in either the first key area 310 or the second key area 320 of the character input keyboard 300, for example, on the character key 312 of " ㅁ " in the first key area 310 as a user operates the four arrow buttons 211, 212, 213, and 214 of the input device 20, and pressing the enter button 225.

Based on the receipt of the first user input of selecting the character key 312 in a certain area, for example, the first key area 310, the processor 140 may control the cursor 1012 to be displayed as moved to a predetermined character key 321 in another area, for example, the second key area 320.

Here, the processor 140 may control the cursor 1012 to move automatically and directly to the character key 321 in the second key area 320, based on identification that the second character (e.g., the combining letter (double consonant or diphthong) predefined for (associated with) the first character corresponding to the character key 312 selected in the first key area 310 by the first user input is absent. In other words, the processor 140 controls the cursor not to move to the conversion key 330, based on the identification that the second character (e.g., combining letter (double consonant or diphthong) predefined for (an associated with) the first character corresponding to the character key 312 selected based on the first user input is absent.

According to an embodiment, based on the receipt of the first user input of selecting the character key 312 in one area and input of a single operation for any one, for example, the right button 212, of the four arrow buttons 211, 212, 213, and 214, the processor 140 may control the cursor 1012 to be displayed as moved to the character key 321 in another area.

Here, the processor 140 may control the cursor 1012 to move directly to a predefined second character 321 in the second key area 320 in response to the first user input of selecting the corresponding character key 312, based on identification that the second character (e.g., combining letter (double consonant or diphthong)) predefined for (associated with) the first character corresponding to the character key 312 selected by the first user input is absent.

Then, the processor 140 may receive a user input of selecting any one of character keys in the second key area 320, for example, the character key 321 of "ㅏ". Accordingly, the input window 340 displays "마" as the input result based on a combination of the first character "ㅁ" and "ㅏ".

According to the foregoing embodiment of the disclosure, the number of operations for the four arrow buttons 211, 212, 213, and 214 for moving between the plurality of key areas 310 and 320 and the conversion key 330 or moving between the first key area 310 and the second key area 320 is reduced, thereby improving the convenience in a user input.

The foregoing embodiment relates to a method of performing the character input operation by moving the cursor to the same position within one row or one column when moving between the plurality of key areas 310 and 320 across the conversion key 330 by operating the four arrow buttons 211, 212, 213, and 214. However, the cursor may be designed to move to a preset position within the plurality of key areas 310 and 320 depending on the situations, thereby reducing the number of operations for the four arrow buttons 211, 212, 213, and 214. These embodiments will be described below.

Figure 11:
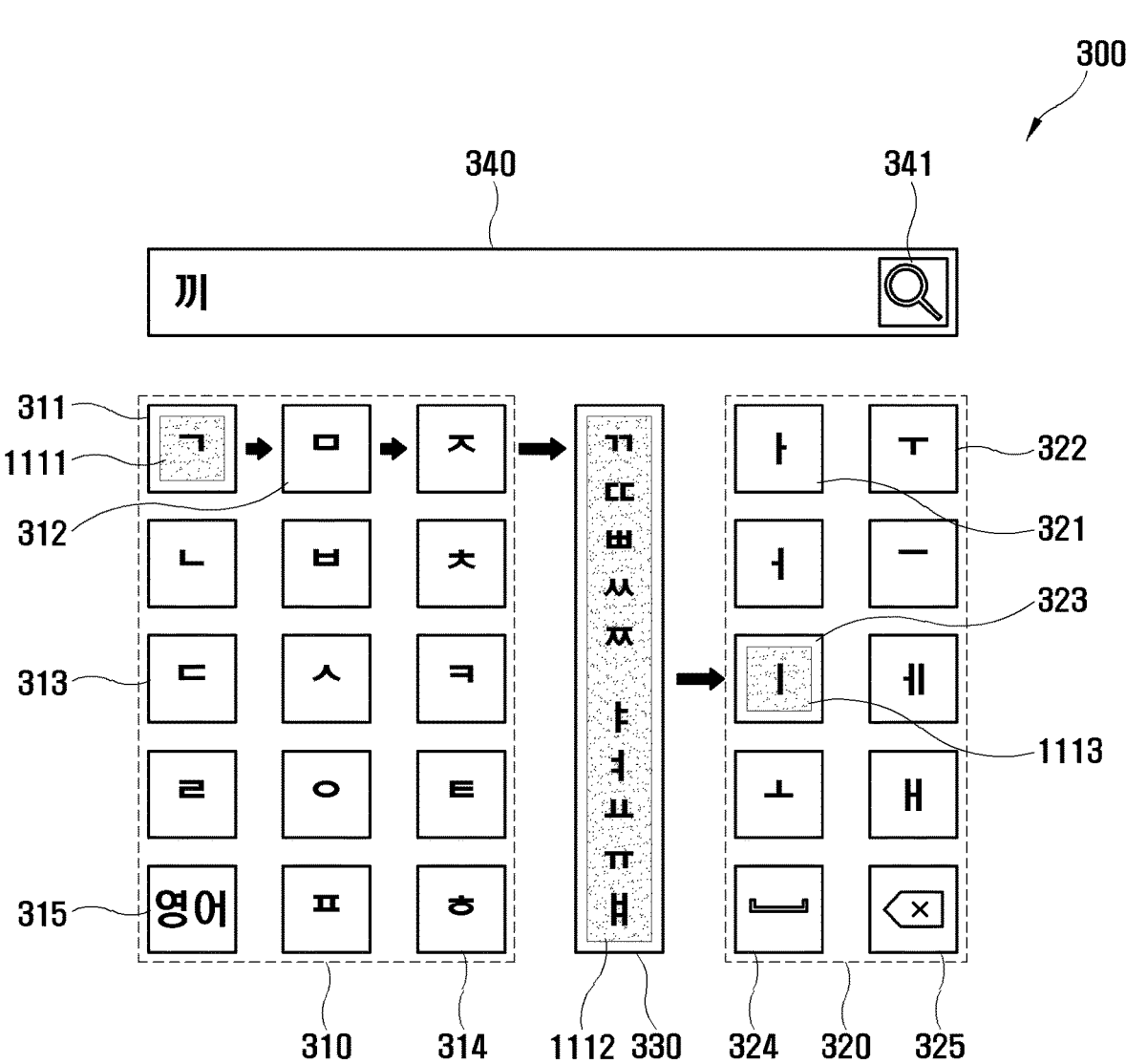
FIG. 11 illustrates another example of inputting characters by moving a cursor on a character input keyboard according to an embodiment of the disclosure.

FIG. 11 illustrates another example of inputting characters by moving a cursor on a character input keyboard according to an embodiment of the disclosure.

Referring to FIG. 11, while the character input keyboard 300 is being displayed on the display 110, the processor 140 may receive the first user input of selecting the corresponding character key 311 by positioning the cursor 1111 on any one character in either the first key area 310 or the second key area 320 of the character input keyboard 300, for example, the character key 311 of " ㄱ " in the first key area 310 as a user operates the four arrow buttons 211, 212, 213, and 214 of the input device 20, and pressing the enter button 225.

Next, the processor 140 may receive the second user input of selecting the conversion key 330 as a user operates the four arrow buttons 211, 212, 213, and 214 of the input device 20 to position the cursor 1112 on the conversion key 330 of the character input keyboard 300 and presses the enter button 225. Here, the processor 140 may control the cursor 1112 to move to the conversion key 330 by operating the right button 212 corresponding to the rightward movement three times while the cursor 1111 is being positioned at the character key 311 of " ㄱ " as shown in FIG. 11, or, alternatively, control the cursor 1112 to be displayed as moved to the conversion key 330 automatically or operating the right button 212 once as described in the embodiment of FIG. 9.

Referring to FIG. 11, the processor 140 may control the cursor 1112 to be displayed as moved to a character key, for example, the character key 323 of "ㅣ" at a preset reference position in the second key area 320, based on a signal received through the interface 120 and corresponding to a single operation for the right button 212 of the input device 20 in the state that the cursor 1112 is moved from the first key area 310 and positioned at the conversion key 330. Here, the reference position may be previously set as a position where the number of operations for the four arrow buttons 211, 212, 213, and 214 can be reduced when moving between the key areas 310 and 320.

According to an embodiment, the reference position may be set to the character key 323 of "ㅣ", which corresponds to the center (e.g., the third row) in the matrix structure of the second key area 320, to which the cursor 1113 will move, and is adjacent to the conversion key 330. Likewise, when moving from the second key area 320 to the first key area 310, the reference position may be set to a character key of 'ㅋ', which corresponds to the center (e.g., the third row) in the matrix structure of the first key area 310, to which the cursor will move, and is adjacent to the conversion key 330.

As another example, the reference position may be set to the character key 321 of "ㅏ", which corresponds to the first row in the matrix structure of the second key area 320, to which the cursor will move, and is adjacent to the conversion key 330. Likewise, when moving from the second key area 320 to the first key area 310, the reference position may be set to the character key of "ㅊ", which corresponds to the first row in the matrix structure of the first key area 310, to which the cursor will move, and is adjacent to the conversion key 330.

According to an embodiment, the preset reference positions in the plurality of key areas 310 and 320 may be assigned with character keys corresponding to characters identified as having the highest frequency of use among the plurality of characters based on a history of user inputs.

According to the foregoing embodiment of the disclosure, the number of operations for the four arrow buttons 211, 212, 213, and 214 for moving between the first key area 310 and the second key area 320 through the conversion key 330 can be reduced, thereby improving the convenience of a user input.

The foregoing embodiment relates to a method of performing the character input operation while moving between the plurality of key areas 310 and 320 across the conversion key 330 by operating the four arrow buttons 211, 212, 213, and 214. However, the cursor may be designed to move between the plurality of key areas 310 and 320 without going through the conversion key 330 depending on the situations, thereby reducing the number of operations for the four arrow buttons 211, 212, 213, and 214. These embodiments will be described below.

Figure 12:
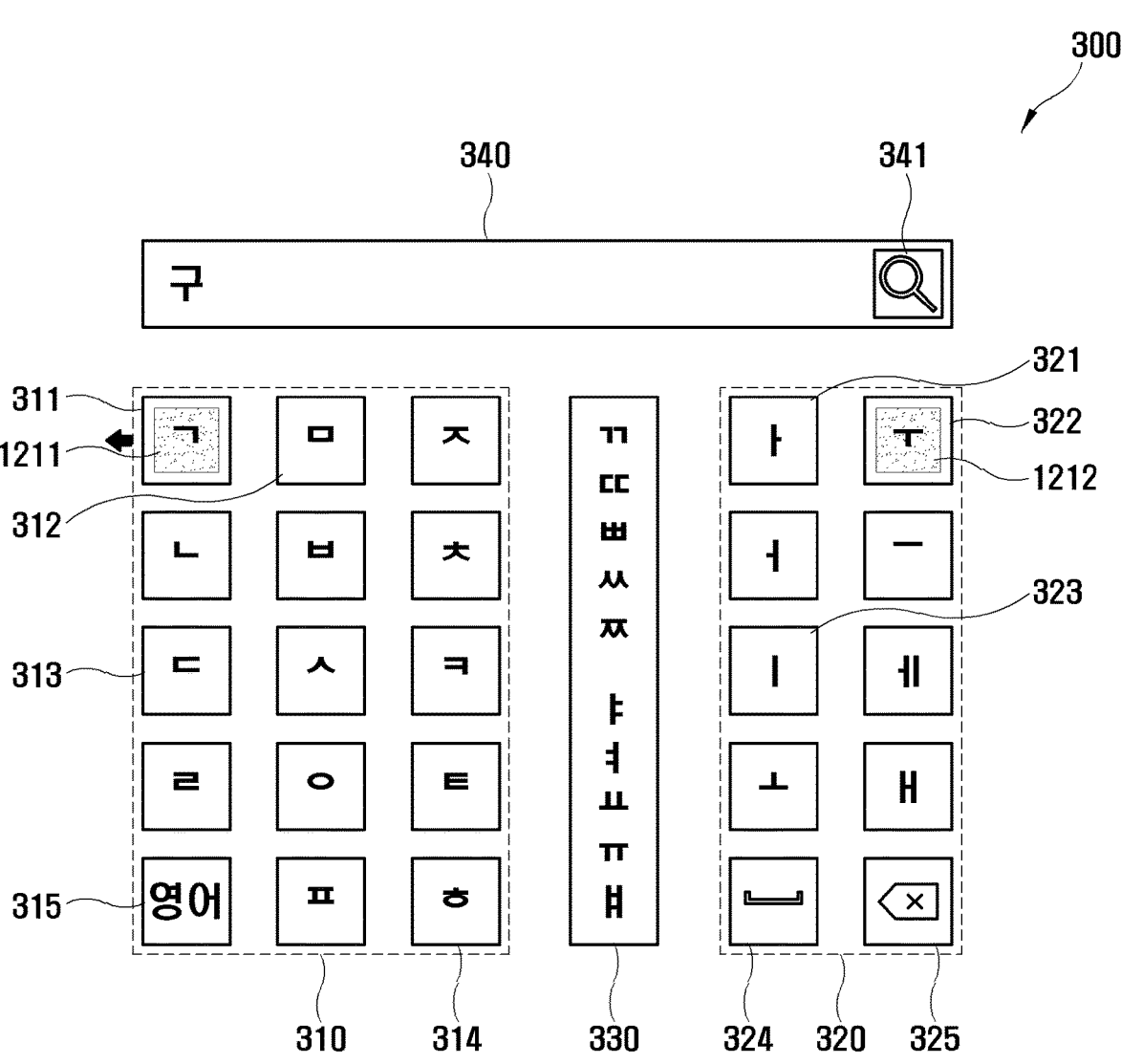
FIG. 12 illustrates still another example of inputting characters by moving a cursor on a character input keyboard according to an embodiment of the disclosure.

FIG. 12 illustrates still another example of inputting characters by moving a cursor on a character input keyboard according to an embodiment of the disclosure.

Referring to FIG. 12, while the character input keyboard 300 is being displayed on the display 110, the processor 140 may receive the first user input of selecting the corresponding character key 311 by positioning the cursor 1211 on any one character in either the first key area 310 or the second key area 320 of the character input keyboard 300, for example, the character key 311 of "ㄱ" in the first key area 310 as a user operates the four arrow buttons 211, 212, 213, and 214 of the input device 20, and pressing the enter button 225.

Next, the processor 140 may receive a user input of operating the left button 211 corresponding to the leftward movement among the four arrow buttons 211, 212, 213, and 214 of the input device 20, in the state that the cursor 1211 is positioned at the character key 311 of "ㄱ", as shown in FIG. 12.

Referring to FIG. 12, the processor 140 may control the cursor 1212 to be displayed as moved to the character key 322 of "ㅜ" in the second key area 320, based on the receipt of a signal corresponding to a single operation for the left button 211 of the input device 20 through the interface 120 in the state that the cursor 1211 is positioned at the character key 311 of "ㄱ" in the first key area 310.

The processor 140 may, for example, move the cursor 1212 to the rightmost character key 322 at the same position (e.g., the first row) where the cursor 1211 has been positioned within the row or column of the previous area (e.g., the first key area 310), as shown in FIG. 12. As another example, the processor 140 may move the cursor to a character key at a preset reference position, for example, the rightmost character key of "ㅐ", which corresponds to the center (e.g., the third row) in the matrix structure of the second key area 320, to which the cursor will move. Here, the reference position may be predetermined as a position that can reduce the number of operations of the four arrow buttons 211, 212, 213, and 214 when moving between the key areas 310 and 320.

According to the foregoing embodiment of the disclosure, it is possible to move between the first key area 310 and the second key area 320 without going through the conversion key 330, so that the four arrow buttons 211, 212, 213, and 214 can be increased in utilization and reduced in the number of operations, thereby improving the convenience in a user input.

As described above, according to the embodiments of the disclosure, it has been described that the character input keyboard 300 includes the first key area 310 and the second key area 320 respectively disposed on the left and right portions of the display 110, and the conversion key 330 disposed between the first key area 310 and the second key area 320, but the character input keyboard 300 may be designed to have various layouts for improving the convenience in a user input. These embodiments will be described below.

Figure 13:
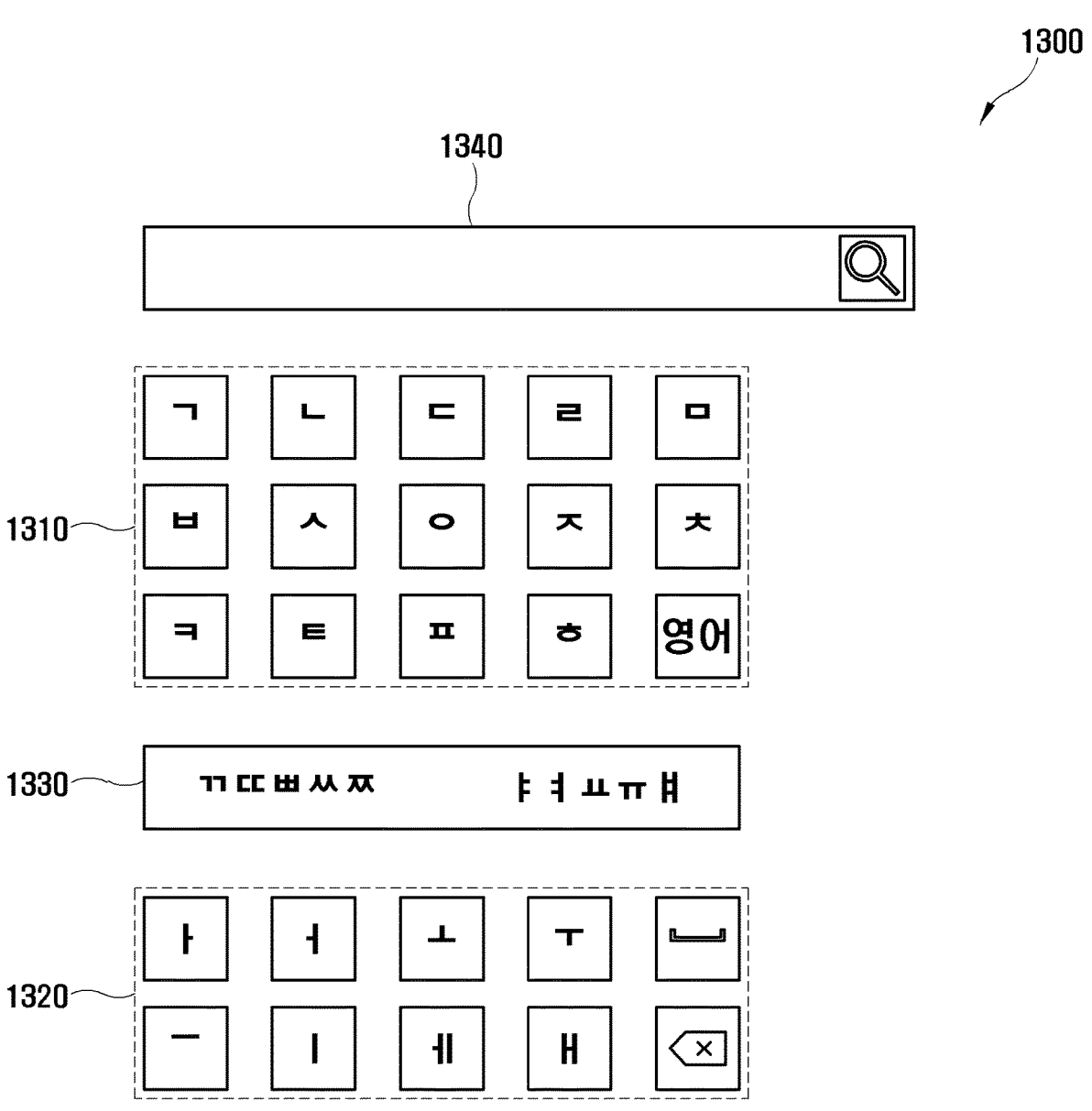
FIG. 13 illustrates another example of an initial screen of a character input keyboard according to an embodiment of the disclosure.

FIG. 13 illustrates another example of an initial screen of a character input keyboard according to an embodiment of the disclosure.

As shown in FIG. 13, the processor 140 of the electronic apparatus 10 according to one embodiment, displays a character input keyboard 1300 including a plurality of character keys corresponding to a plurality of characters.

The character input keyboard 1300 may include a first key area 1310 where the character keys corresponding to a first character group (e.g., a consonant group) are arranged, and a second key area 1320 where the character keys corresponding to a second character group (e.g., a vowel group) are arranged.

The first key area 1310 and the second key area 1320 may be disposed, for example, at the upper and lower portions of the screen, respectively. In other words, the first key area 1310 and the second key area 1320 may be disposed in the second direction (or vertical direction).

Further, the character input keyboard 1300 may include an input window 1340 that displays results of input or selection for the character key.

Referring to FIG. 13, the first key area 1310 and the second key area 1320 may have the character keys arranged in a matrix form, for example, the first key area 1310 may include the character keys arranged in a 5×3 matrix, and the second key area 1320 may include the character keys arranged in a 5×2 matrix. According to an embodiment, each character key in the first key area 1310 and the second key area 1320 may be assigned one character.

The character input keyboard 1300 may include a conversion key 1330 disposed adjacent to at least one of the plurality of key areas 1310 and 1320. For example, the conversion key 1330 may be disposed between the first key area 1310 and the second key area 1320 located at the upper and lower portions of the screen.

The conversion key 1330 may be implemented as a horizontal bar or vertical bar extending in either a first direction (e.g., horizontal direction) and a second direction (e.g., vertical direction) perpendicular to the first direction. Specifically, referring to FIG. 13, the conversion key 1330 may be shaped like a bar extending in the first direction (e.g., horizontal direction) perpendicular to the second direction (e.g., vertical direction) in which the first key area 1310 and the second key area 1320 are arranged.

According to an embodiment, the length of the conversion key 1330 in the extending direction, i.e., the first direction, may correspond to the first key area 1310 or the second key area 1320. For example, referring to FIG. 13, when the conversion key 1330 is implemented as a horizontal bar extending in the first direction (e.g., horizontal direction), the length of the conversion key 1330 in the first direction may correspond to a corresponding length of the first key area 310 and the second key area 320 in the first direction of, i.e., the horizontal length.

With respect to a character corresponding to a character key selected in an adjacent key area, i.e., either the first key area 1310 or the second key area 1320, the conversion key 1330 may be provide to perform conversion as a predefined input operation of converting a first character (e.g., a single letter) corresponding to the selected character key to a second character (e.g., a combining letter) associated with the first character.

According to an embodiment, the convertible second characters, for example, the characters of "ㄲ, ㄸ, ㅃ, ㅆ, ㅉ, ㅑ, ㅕ, ㅛ, ㅠ, ㅒ", i.e., the combining letters such as the double consonants or the diphthongs may be displayed within the area of the conversion key 330.

The cursor may be displayed as overlaid on the character input keyboard 1300. For example, the cursor may be represented by highlighting a key corresponding to its current position on the character input keyboard 1300. The movement of the cursor on the character input keyboard 1300 corresponds to the input of the four arrow buttons 211, 212, 213, and 214 of the input device 20.

According to an embodiment, the processor 140 may display on the display 110 the character input keyboard 1300 including the plurality of key areas 1310 and 1320 and the conversion key 1330 where the plurality of character keys are arranged corresponding to the plurality of characters of a specific language as described above.

Based on the receipt of user inputs for selecting any one character key in the plurality of key areas 1310 and 1320 and subsequently selecting the conversion key 1330, the processor 140 may perform an operation for a second character (e.g., a combining letter, such as a double consonant or a diphthong) associated with the first character (e.g., a single letter, such as a single consonant or a monophthong) corresponding to the selected character key in place of the first character.

The input/display operations for the characters using the conversion key 1130 and the four arrow buttons 211, 212, 213, and 214 have been described above with reference to FIGS. 3 to 9, and thus repetitive descriptions thereof will be avoided. Further, the method of moving the cursor described above with reference to FIGS. 8 to 12 may be implemented by the same principles as operating the up button 213 or the down button 214 or automatically in the embodiment of FIG. 13, and thus repetitive descriptions thereof will be avoided.

Figure 14:
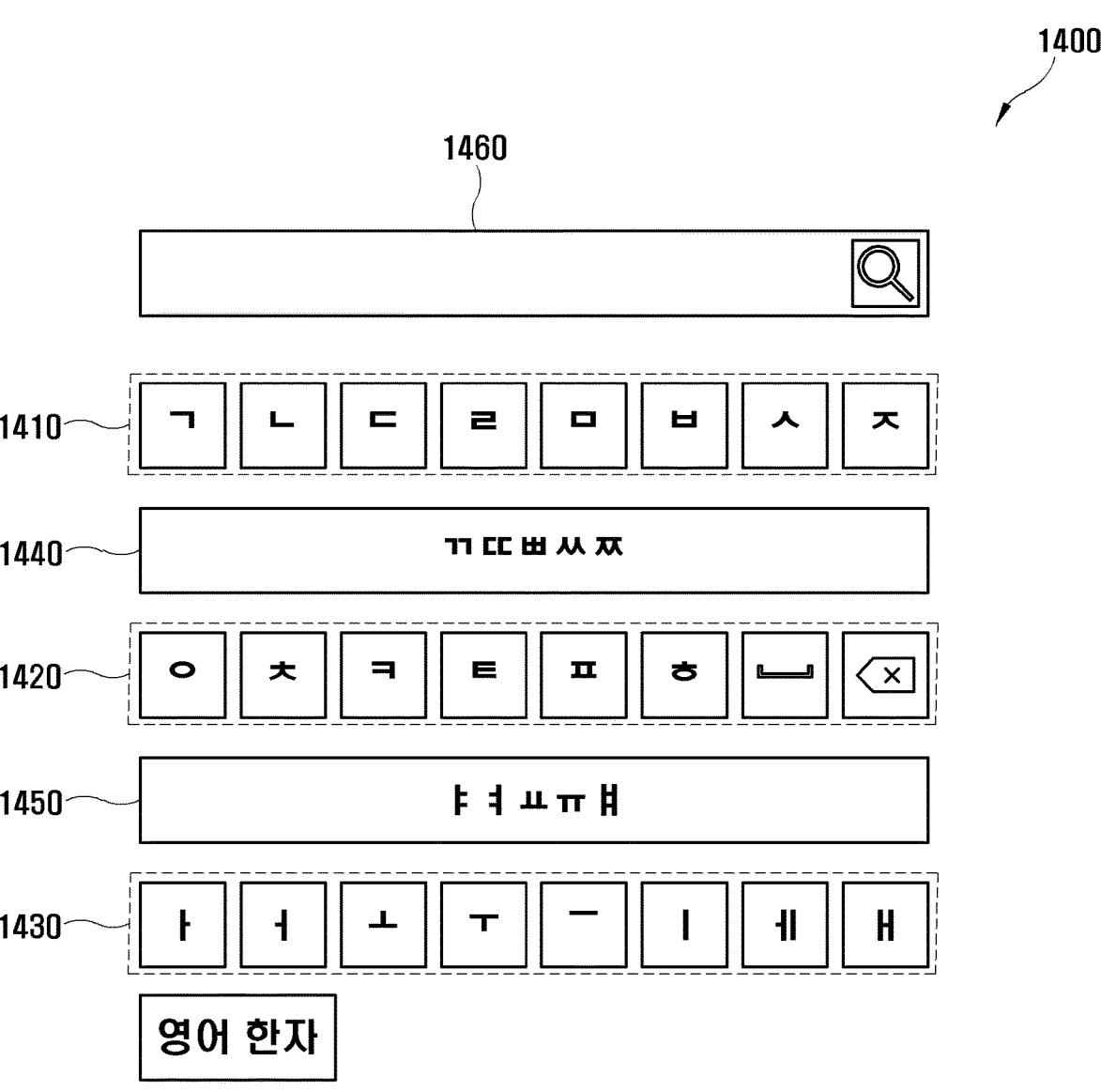
FIG. 14 illustrates still another example of an initial screen of a character input keyboard according to an embodiment of the disclosure.
Figure 15:
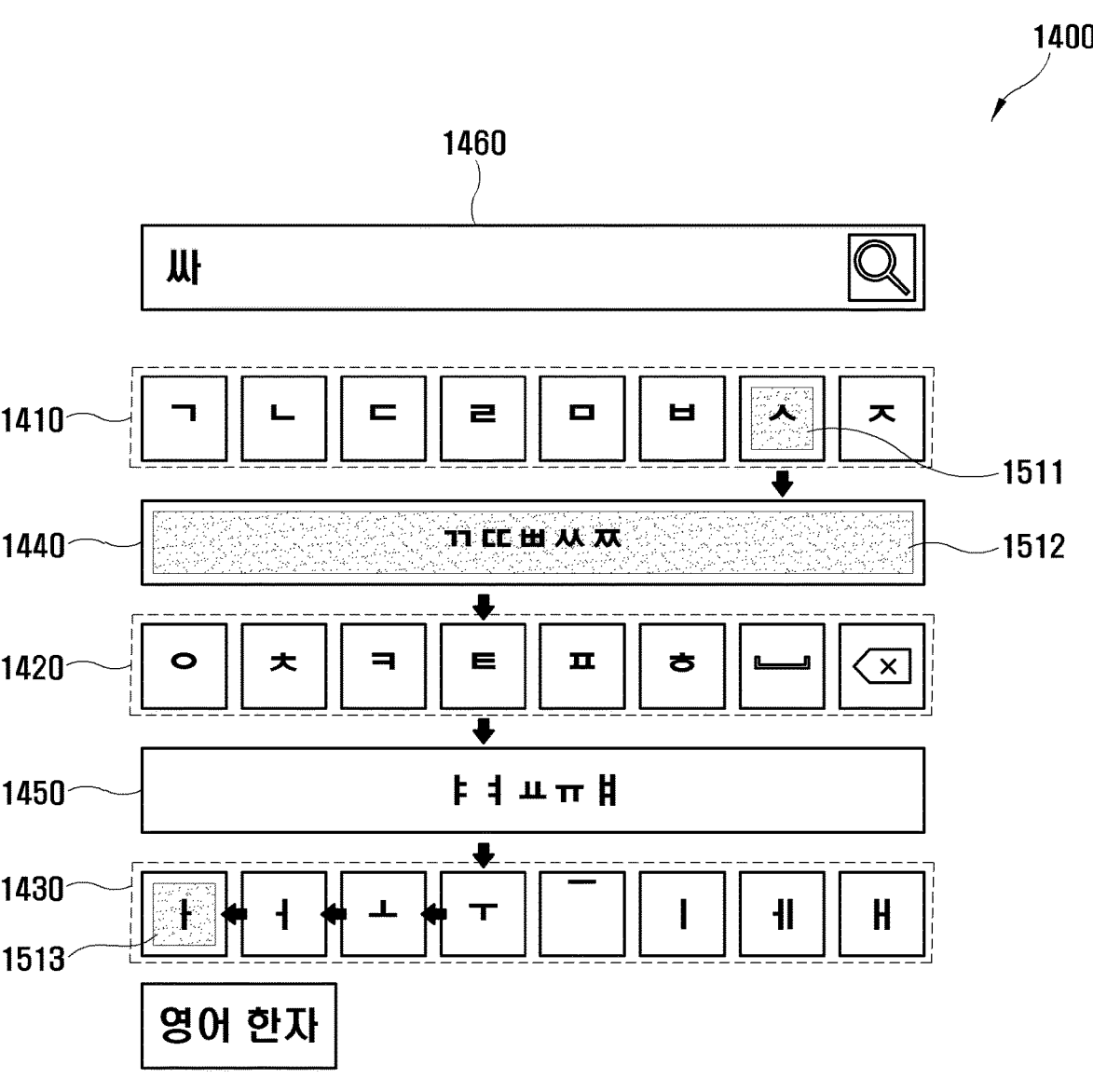
FIG. 15 illustrates an example of inputting characters through the character input keyboard of FIG. 14.

FIG. 14 illustrates still another example of an initial screen of a character input keyboard according to an embodiment of the disclosure, and FIG. 15 illustrates an example of inputting characters through the character input keyboard of FIG. 14.

As shown in FIG. 14, the processor 140 of the electronic apparatus 10 according to an embodiment, displays a character input keyboard 1400 including a plurality of character keys corresponding to a plurality of characters.

The character input keyboard 1400 may include a plurality of key areas 1410, 1420, and 1430, for example, a first key area 1410, a second key area 1420, and a third key area 1430, where character keys are arranged. According to an embodiment, each character key of the first key area 1410, the second key area 1420, and the third key area 1430 may be assigned one character.

According to an embodiment, the character keys corresponding to a first character group (e.g., a consonant group) may be arranged in the first key area 1410 and the second key area 1420.

The first character group, i.e., the consonant group may include a plurality of sub-character groups (hereinafter referred to as sub-consonant groups). For example, the consonant group may be classified into a first sub-consonant group of "ㄱ, ㄴ, ㄷ, ㄹ, ㅁ, ㅂ, ㅅ, A and ㅊ" and a second sub-consonant group of "ㅇ, ㅈ, ㅋ, ㅌ, ㅍ, and ㅎ". Here, the first sub-consonant group is defined as a group of single consonants of which predefined second characters, i.e., combining letters (or double consonants) are present as associated characters, i.e., related characters, and the second sub-consonant group is defined as a group of single consonants of which the related characters are not present.

In the third key area 1430, the character keys corresponding to the second character group (e.g., the vowel group) may be arranged.

The first key area 1410, the second key area 1420, and the third key area 1430 may include the character keys arranged in the form of lines. However, the first key area 1410, the second key area 1420, and the third key area 1430 may include the character keys arranged in the form of a matrix.

The first key area 1410, the second key area 1420 and the third key area 1430 may be arranged in units of rows, for example, as shown in FIGS. 13 and 14. In other words, the first key area 1410, the second key area 1420 and the third key area 1430 may be sequentially arranged in the second direction (or vertical direction). However, the first key area 1410, the second key area 1420 and the third key area 1430 may be sequentially arranged in units of columns, i.e., in the first direction (or horizontal direction), and may be arranged along an oblique direction as necessary.

Further, the character input keyboard 1400 may include an input window 1460 that displays results of inputting or selecting the character key.

According to an embodiment, the character input keyboard 1400 may include a plurality of conversion keys disposed adjacent to at least one of the plurality of key areas 1410, 1420, and 1430, for example, a first conversion key 1440 and a second conversion key 1450. For example, referring to FIGS. 13 and 14, the first conversion key 1440 may be disposed adjacent to (e.g., the lower side of) the first key area 1410, and the second conversion key 1450 may be disposed adjacent to (e.g., the upper side of) the third key area 1430.

The first conversion key 1440 and the second conversion key 1450 may be implemented as a horizontal bar or vertical bar extending in either the first direction (e.g., the horizontal direction) or the second direction (e.g., the vertical direction) perpendicular to the first direction. For example, when the first key area 1410, the second key area 1420 and the third key area 1430 are arranged in units of rows, as shown in FIGS. 13 and 14, the first conversion key 1440 and the second conversion key 1450 may be implemented as horizontal bars.

According to an embodiment, the length of the first conversion key 1440 and the second conversion key 1450 in the extending direction, i.e., the first direction may correspond to the length of the first key area 1410, the second key area 1420 or the third key area 1430. For example, referring to FIGS. 13 and 14, when the first conversion key 1440 and the second conversion key 1450 are implemented as the horizontal bar extending in the first direction (e.g., the horizontal direction), the length of the first conversion key 1440 and the second conversion key 1450 in the first direction may correspond to the length of the first key area 1410, the second key area 1420 or the third key area 1430 in the corresponding first direction, i.e., the horizontal length.

With respect to a character corresponding to a character key selected in an adjacent key area, i.e., either the first key area 1410 or the third key area 1430, the first conversion key 1440 and the second conversion key 1450 may be provided to perform conversion as a predefined input operation of converting a first character (e.g., a single letter) corresponding to the selected character key to a second character (e.g., a combining letter) associated with the first character.

According to an embodiment, the convertible second character (e.g., combining letter) may be displayed within the areas of the first conversion key 1440 and the second conversion key 1450. For example, the double consonants such as "ㄲ, ㄸ, ㅃ, ㅆ, ㅉ" may be displayed within the area of the first conversion key 1440, and the diphthongs such as "ㅑ, ㅕ, ㅛ, ㅠ, ㅒ" may be displayed within the area of the second conversion key 1450.

The cursor may be displayed as overlaid on the character input keyboard 1400. For example, the cursor may be represented by highlighting a key corresponding to its current position on the character input keyboard 1400. The movement of the cursor on the character input keyboard 1400 corresponds to the input of the four arrow buttons 211, 212, 213, and 214 of the input device 20.

According to an embodiment, the processor 140 may display on the display 110 the character input keyboard 1400 including a plurality of key areas 1410 and 1420 and a plurality of conversion keys 1440 and 1450 where the plurality of character keys are arranged corresponding to the plurality of characters of a specific language as described above.

Based on the receipt of user inputs for selecting any one character key in the plurality of key areas 1410, 1420 and 1430 and subsequently selecting a neighboring one of the conversion keys 1440 and 1450, the processor 140 may perform an operation for the second character (e.g., a combining letter) associated with the first character (e.g., a single letter) corresponding to the selected character key in place of the first character.

Referring to FIG. 15, while the character input keyboard 1400 is being displayed on the display 110, a user can make a first user input by operating the four arrow buttons 211, 212, 213, and 214 of the input device 20 to position the cursor 1611 on any one character in either the first key area 1410 or the second key area 1420 of the character input keyboard 1400, for example, on the character key of 'ㅅ' in the first key area 1410, and pressing the enter button 225 to select that character key.

Next, a user may operate the four arrow buttons 211, 212, 213, and 214 of the input device 20 to position the cursor 1512 on the first conversion key 1440 of the character input keyboard 1400, and press the enter button 225, thereby making the second user input to select the first conversion key 1440. Here, in the state that the cursor 1511 is positioned at the character key of 'ㅅ' as shown in FIGS. 14 and 15, the processor 240 may, for example, move the cursor 1512 to the first conversion key 14440 based on the receipt of a user input of operating the down button 214 corresponding to the downward movement once, or as another example, the processor 240 may move the cursor 1512 automatically to the first conversion key 1440 based on the first user input of selecting the character key of 'ㅅ'.

According to an embodiment, the processor 140 may receive the second user input of selecting the first conversion key 1440 in succession to the first user input of selecting the character key of 'ㅅ'. In other words, the second user input is received consecutively to the first user input, as a selection input resulting from pressing the enter button 225.

Based on the selection (the first user input) of the character key 'ㅅ' in the first key area 1410 and the subsequent selection (the second user input) of the first conversion key 1440, the processor 140 may control an operation to be performed for a combining letter (or double consonant) 'ㅆ', i.e., the second character associated with the first character, i.e., a single consonant 'ㅅ' in place of the first character corresponding to the selected character key. Accordingly, the input window 1460 may display the second character 'ㅆ' as an input result.

In succession, the processor 140 may receive a user input of operating the four arrow buttons 211, 212, 213, and 214 of the input device 20 to position the cursor 1513 on any one character key, for example, the character key of "ㅏ" in the third key area 1430 of the character input keyboard 1400, and pressing the enter button 225 to select that character key. In other words, a user may move the cursor 1513 to the character key of "ㅏ" by sequentially operating the down button 214 and the left button 141 multiple times while the cursor 1512 is being positioned at the conversion key 330, as shown in FIG. 15. Here, the cursor 1512 located at the first conversion key 1440 may be moved to the same column (e.g., the seventh column) as that of the character "ㅅ" selected in the previous area, i.e., the first key area 1511 in response to the operation of the down button 214, as described in FIG. 8, or may be moved to a preset reference position (e.g., the fourth column, see FIG. 15), as described with reference to FIG. 11.

Then, the processor 140 may control operations (e.g., input and display operations) to be performed for the character "ㅏ", based on the receipt of the enter button 225 (the first user input) for selecting that character "ㅏ" on which the cursor 1513 is positioned. Accordingly, the input window 1460 displays " 싸 " as the input result based on a combination of " ㅆ " and " ㅏ ".

When the character " ㅏ " in the third key area 1430 is selected (the first user input) and the second conversion key 1450 is subsequently selected (the second user input), the processor 140 may control operations to performed for the combining letter (the diphthong) " ㅑ " as the first character corresponding to the selected character key, i.e., as the second character associated with the first character in place of the single consonant " ㅏ ". Accordingly, the input window 1460 may display " 쌰 " as an input result based on a combination with the second character.

According to an embodiment of the disclosure as above, the plurality of conversion keys 1440 and 1450 are disposed adjacent to the key area 1410 and 1430 where the character keys are arranged corresponding to the characters to be converted, so that conversion into the associated character can be easily performed and the number of operations for movement can be reduced, thereby improving the convenience in a user input.

Figure 16:
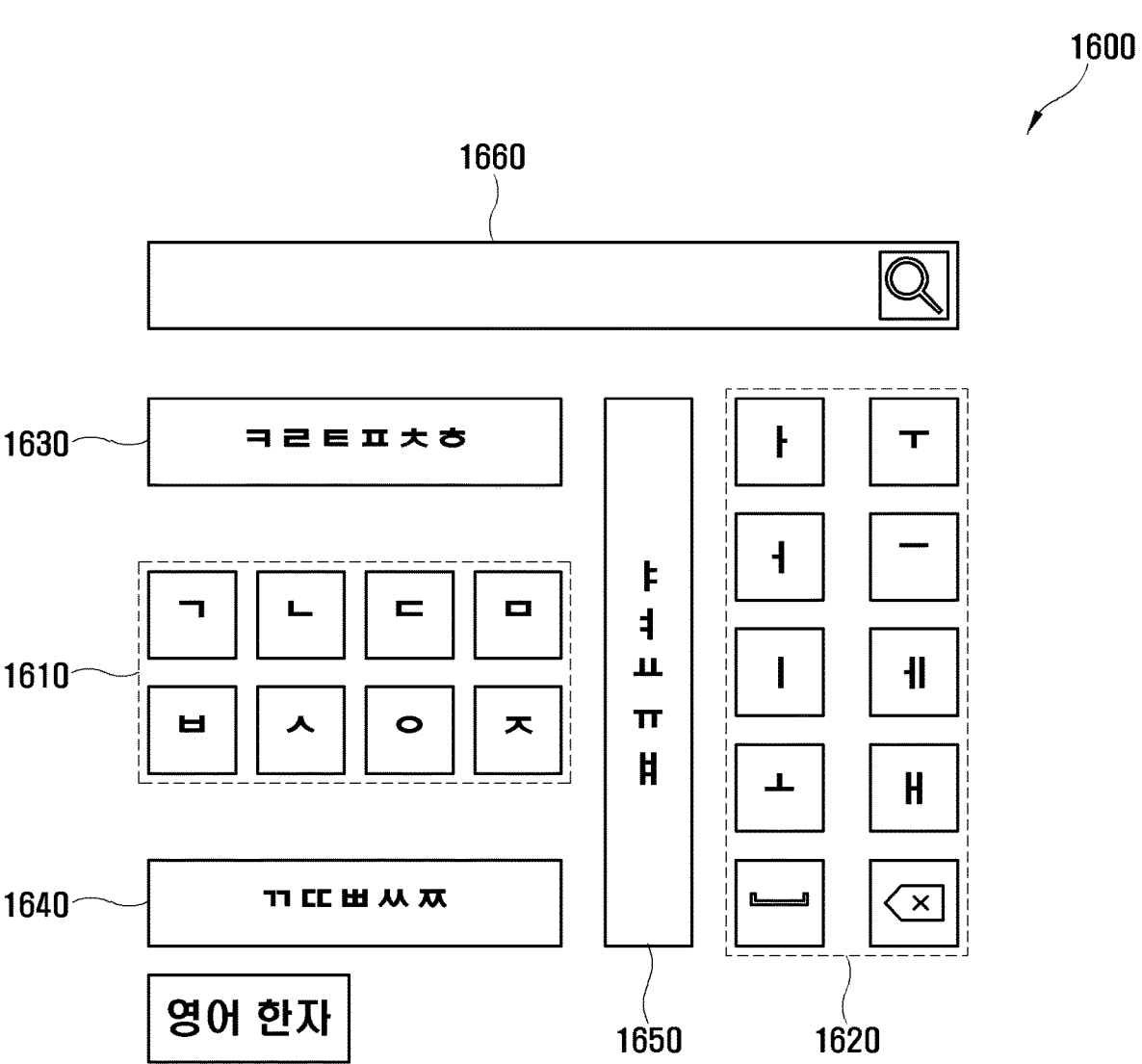
FIG. 16 illustrates yet another example of an initial screen of a character input keyboard according to an embodiment of the disclosure.

FIG. 16 illustrates yet another example of an initial screen of a character input keyboard according to an embodiment of the disclosure.

As shown in FIG. 16, the processor 140 of the electronic apparatus 10 according to an embodiment to the disclosure a character input keyboard 1600 including a plurality of character keys corresponding to a plurality of characters.

The character input keyboard 1600 may include a plurality of key areas 1610 and 1620, for example, a first key area 1610, and a second key area 1620, where character keys are arranged. According to an embodiment, each character key of the first key area 1610 and the second key area 1620 may be assigned one character.

According to an embodiment, the character keys corresponding to the first character group (e.g., consonant group) may be arranged in the first key area 1610. For example, the character keys corresponding to the characters of " ㄱ, ㄴ, ㄷ, ㅁ, ㅂ, ㅅ, ㅇ, and ㅈ " may be arranged in the first key area 1610.

In the second key area 1620, the character keys corresponding to the second character group (e.g., vowel group) may be arranged.

The first key area 1610 and the second key area 1620 may include the character keys arranged in the form of a matrix. Referring to FIGS. 15 and 16, for example, the first key area 1610 may include the character keys arranged in a 4×2 matrix, and the second key area 1620 may include the character keys arranged in a 2×5 matrix, but the number and layout of the character keys in each key area are not limited to those shown in FIGS. 15 and 16.

Further, the character input keyboard 1600 may include an input window 1660 that displays results of inputting or selecting the character key.

According to an embodiment, the character input keyboard 1600 may include a plurality of conversion keys, for example, a first conversion key 1630, a second conversion key 1640, and a third conversion key 1650, which are disposed adjacent to at least one of the plurality of key areas 1610 and 1620. For example, referring to FIGS. 15 and 16, the first conversion key 1630 and the second conversion key 1640 may be disposed adjacent to (e.g., the upper and lower sides of) the first key area 1610, and the third conversion key 1650 may be disposed adjacent to (e.g., the left side of) the second key area 1620.

The first conversion key 1630, the second conversion key 1640, and the third conversion key 1650 may be implemented as a horizontal bar or vertical bar extending in either the first direction (e.g., the horizontal direction) or the second direction (e.g., the vertical direction) perpendicular to the first direction. For example, as shown in FIG. 16, the first conversion key 1630 and the second conversion key 1640 may be implemented as the horizontal bars, and the third conversion key 1650 may be implemented as the vertical bar.

The length of the first conversion key 1630, the second conversion key 1640, and the third conversion key 1650 in the extended direction may be implemented to correspond to the length of the first key area 1610 or the second key area 1620. For example, referring to FIG. 16, when the first conversion key 1640 and the second conversion key 1650 are implemented as the horizontal bars extending in the first direction (e.g., horizontal direction), the length of the first conversion key 1640 and the second conversion key 1650 in the first direction may correspond to the length of the first key area 1610 in the first direction, i.e., the horizontal length. Further, when the third conversion key 1650 is implemented as the vertical bar extending in the second direction (e.g., vertical direction), the length of the third conversion key 1650 in the second direction may correspond to the length of the second key area 1620 in the second direction, i.e., the vertical length.

With respect to a character corresponding to a character key selected in an adjacent key area, i.e., either the first key area 1610 or the second key area 1630, the first conversion key 1630, the second conversion key 1640, and the third conversion key 1650 may be provided to perform conversion as a predefined input operation of converting a first character (e.g., a single letter) corresponding to the selected character key to a second character (e.g., a combining letter) related to the first character.

According to an embodiment, both the first conversion key 1630 and the second conversion key 1640 may be provided to convert the character in the first key area 1610, i.e., the character that belongs to the first character group (or consonant group), to a predefined associated character (the related character).

Specifically, the processor 160 may perform input operations by converting a selected character, i.e., a single consonant, into a consonant with an added stroke, based on the character key being selected in the first key area 1610 and the first conversion key 1630 being subsequently selected. For example, when the character key, for example, the character key of the single consonant " ㄷ " is selected in the first key area 1610, and the first conversion key 1630 is subsequently selected, the single consonant " ㄷ " corresponding to the selected character key may be converted into the stroke-added consonant " ㅌ " associated with that single consonant.

Further, the processor 160 may perform input operations by converting a selected character, i.e., a single consonant, into a double consonant, based on the character key being selected in the first key area 1610 and the second conversion key 1640 being subsequently selected. For example, when the character key in the first key area 1610, for example, the character key of the single consonant " ㄷ " is selected, and the second conversion key 1640 is successively selected, the single consonant " ㄷ " corresponding to the selected character key may be converted into the double consonant " ㄸ " associated with that single consonant.

The third conversion key 1630 may be provided to convert the character in the second key area 1620, i.e., the character that belongs to the second character group (the vowel group), into a predefined associated character (related character).

Specifically, the processor 160 may perform input operations by converting the selected character, i.e., the monophthong, into the diphthong, based on the character key being selected in the second key area 1620 and the third conversion key 1650 being subsequently selected. For instance, when the character key in the first key area 1620, e.g., the character key of the single consonant "ㅗ" is selected and the third conversion key 1650 is subsequently selected, the monophthong "ㅗ" corresponding to the selected character key may be converted into the diphthong "ㅛ" associated with that monophthong.

According to an embodiment, second characters (e.g., combining letters) that are convertible may be displayed within the areas of the first conversion key 1630, the second conversion key 1640, and the third conversion key 1650. For example, the stroke-added consonants such as "ㅋ, ㄹ, ㅌ, ㅍ, ㅊ, and ㅎ" are displayed in the area of the first conversion key 1630, the double consonants such as "ㄲ, ㄸ, ㅃ, ㅆ, and ㅉ" are displayed in the area of the second conversion key 1640, and the diphthongs such as "ㅑ, ㅕ, ㅛ, ㅠ, and ㅒ" are displayed in the area of the third conversion key 1650.

The cursor may be displayed as overlaid on the character input keyboard 1600. For example, the cursor may be represented by highlighting a key corresponding to a current position in the character input keyboard 1600. The movement of the cursor on the character input keyboard 1600 corresponds to the input of the four arrow buttons 211, 212, 213, and 214 of the input device 20.

The method of moving the cursor has been described above with reference to FIGS. 8 to 12, and thus repetitive descriptions thereof will be avoided.

Various embodiments of the disclosure and terms used therein are not intended to limit the technical features described in the disclosure, but required to be construed as including various modifications, equivalents or substitutions of the embodiments. In connection with the description of the drawings, like reference numerals may refer to similar or related elements. A singular form of a noun corresponding to an item may include one item or a plurality of items unless otherwise contextually indicated clearly. In this disclosure, "A or B", "at least one of A and B", "at least one of A or B", "A, B or C", "at least one of A, B and C", and "at least one of A, B, or C" and the like phrase may include any one of items listed together in the corresponding phrase, or all possible combinations thereof. "first", "second", and the like terms may be used only for distinguishing an element from other elements, and these elements are not restricted in other aspects (e.g., importance or order). When it is mentioned that one (e.g., first) element is "coupled" or "connected" to another (e.g., second) element with or without terms of "functionally" or "communicatively", it means that one element can be connected to another element directly (e.g., by a wire), wirelessly, or through a third element.

The term "module" used in various embodiments of the disclosure may include a unit embodied in hardware, software or firmware, and is interchangeable with the terms such as, for example, logic, logic block, parts, or circuit. The module may be an integrally formed element, or a minimum unit of the element or a part of the minimum unit, which performs one or more functions. For example, according to an embodiment, the module may be embodied in the form of an application-specific integrated circuit (ASIC).

Various embodiments of the disclosure may be carried out by software (e.g., the program) including one or more instructions stored in a storage medium (e.g., an internal memory or an external memory) readable by a machine (e.g., the electronic apparatus 10). For example, the processor (e.g., the processor 140) of the machine (e.g., the electronic apparatus 10) may call at least one instruction among one or more stored instructions from the storage medium, and execute the called instruction. This makes it possible for the machine to perform at least one function according to the at least one called instruction. The one or more instructions may include a code generated by a compiler or a code executable by an interpreter. The machine-readable storage medium may be provided in the form of a non-transitory storage medium. Here, 'non-transitory' merely means that the storage medium is tangible and does not include a signal (e.g., an electromagnetic wave), without distinguishing between a case where data is semi-permanently stored in the storage medium and a case where data is temporarily stored.

According to an embodiment, methods according to various embodiments of the disclosure may be provided as involved in a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product may be transitorily stored or temporarily produced in a machine-readable storage medium such as a memory of a manufacturer server, an application-store server, or a relay server.

According to various embodiments, each element (e.g., the module or the program) of the foregoing elements may include a singular entity or a plurality of entities, and some among the plurality of entities may be separated and disposed in another element. According to various embodiments, one or more elements among the foregoing elements or operations may be omitted, or one or more other elements or operations may be added. Alternatively or additionally, a plurality of elements (e.g., the module or the program) may be integrated into a single element. In this case, the integrated element may perform one or more functions of the element among the plurality of elements equally or similarly to those performed by the corresponding element among the plurality of elements before the integration. According to various embodiments, operations performed by the module, the program or other elements may be executed in sequence, in parallel, repetitively, or heuristically, or one or more among the foregoing operations may be performed in different order, be omitted or additionally include one or more other operations.

Although a few exemplary embodiments of the disclosure have been described in detail, various changes may be made in these exemplary embodiments without departing from the scope defined in the appended claims.

What is claimed:

1. An electronic apparatus comprising:
   a display;
   an interface; and
   a processor configured to display a character input keyboard, which includes a plurality of character keys corresponding to a plurality of characters of a specific language, and a cursor for pointing at any one of the plurality of character keys, on the display, and to perform an input operation for a character corresponding to a character key pointed by the cursor among the plurality of character keys based on movement and selection instructions received through the interface, wherein at least one character selected from a first character group among the plurality of characters and at least one character selected from a second character group among the plurality of characters are combinable to form a syllable of the language, the character input keyboard includes:

a first key area where character keys of the plurality of character keys corresponding to the first character group are arranged, a second key area where character keys of the plurality of character keys corresponding to the second character group are arranged, and a conversion key arranged between an outside of the first key area and an outside of the second key area, and the processor is configured to display a first character corresponding to a selected character key based on selection of the character key in the first key area or the second key area, and display a second character associated with the first character in place of the first character based on selection of the conversion key arranged between the outside of the first key area and the outside of the second key area while the first character is being displayed.

2. The electronic apparatus of claim 1, wherein the plurality of characters include Hangul (Korean alphabet).

3. The electronic apparatus of claim 2, wherein the first character group corresponds to a consonant group, and the second character group corresponds to a vowel group.

4. The electronic apparatus of claim 2, wherein the first character corresponds to a single letter, and the second character corresponds to a combining letter of the first character.

5. The electronic apparatus of claim 1, wherein the conversion key includes a bar extending in a second direction perpendicular to a first direction in which the first key area and the second key area are arranged, and has a length in the second direction corresponding to the first key area or the second key area.

6. The electronic apparatus of claim 1, wherein the processor is configured to control the cursor to be displayed as moved to the conversion key, based on selection of the character key in the first key area or the second key area.

7. The electronic apparatus of claim 6, wherein the processor is configured to:

display the cursor as moved to the conversion key, based on identification that the second character predefined for the first character corresponding to the selected character key is present; and control the cursor not to move to the conversion key, based on identification that the second character predefined for the first character corresponding to the selected character key is absent.

8. The electronic apparatus of claim 1, wherein, based on selection of a character key in one area of the first key area and the second key area, the processor is configured to control the cursor as moved to any character key in an other area of the first key area and the second key area.

9. The electronic apparatus of claim 8, wherein the processor is configured to control the cursor to be displayed as moved to any character key in the other area, based on identification that the second character predefined for the first character corresponding to the selected character key is absent.

10. The electronic apparatus of claim 1, wherein the plurality of character keys are arranged as a matrix form in the first key area and the second key area, and the processor is configured to control the cursor to be displayed as moved to a preset reference position or a same row or column position in the first key area and the second key area, based on a movement instruction for the cursor received through the interface.

11. A method of controlling an electronic apparatus, comprising:

displaying a character input keyboard, which includes a plurality of character keys corresponding to a plurality of characters of a specific language, and a cursor for pointing at any one of the plurality of character keys, on a display; and performing an input operation for a character corresponding to a character key pointed by the cursor among the plurality of character keys based on movement and selection instructions received through an interface, wherein at least one character selected from a first character group among the plurality of characters and at least one character selected from a second character group among the plurality of characters are combinable to form a syllable of the language, the character input keyboard includes:

a first key area where character keys of the plurality of character keys corresponding to the first character group are arranged, a second key area where character keys of the plurality of character keys corresponding to the second character group are arranged, and a conversion key arranged between an outside of the first key area and an outside of the second key area, and the performing the input operation for the character includes:

displaying a first character corresponding to a selected character key based on selection of the character key in the first key area or the second key area, and displaying a second character associated with the first character in place of the first character based on selection of the conversion key arranged between the outside of the first key area and the outside of the second key area while the first character is being displayed.

12. The method of claim 11, wherein the conversion key includes a bar extending in a second direction perpendicular to a first direction in which the first key area and the second key area are arranged, and has a length in the second direction corresponding to the first key area or the second key area.

13. The method of claim 11, further comprising:

controlling the cursor to be displayed as moved to the conversion key, based on selection of the character key in the first key area or the second key area.

14. The method of claim 13, further comprising:

displaying the cursor as moved to the conversion key, based on identification that the second character predefined for the first character corresponding to the selected character key is present; and controlling the cursor not to move to the conversion key, based on identification that the second character predefined for the first character corresponding to the selected character key is absent.

15. The method of claim 11, further comprising: based on selection of a character key in one area of the first key area and the second key area, controlling the cursor as moved to any character key in an other area of the first key area and the second key area.

* * * * *